(12) United States Patent
Huff

(10) Patent No.: US 11,788,646 B1
(45) Date of Patent: Oct. 17, 2023

(54) THREE-WAY PIEZOELECTRICALLY-ACTUATED MICROVALVE DEVICE AND METHOD OF FABRICATION

(71) Applicant: CORPORATION FOR NATIONAL RESEARCH INITIATIVES, Reston, VA (US)

(72) Inventor: Michael Huff, Oakton, VA (US)

(73) Assignee: Corporation for National Research Initiatives, Reston, VA (US)

(*) Notice: Subject to any disclaimer, the term of this patent is extended or adjusted under 35 U.S.C. 154(b) by 0 days.

(21) Appl. No.: 17/716,811

(22) Filed: Apr. 8, 2022

Related U.S. Application Data

(62) Division of application No. 15/894,716, filed on Feb. 12, 2018, now Pat. No. 11,326,717.

(51) Int. Cl.
  *F16K 99/00* (2006.01)
(52) U.S. Cl.
  CPC ...... *F16K 99/0015* (2013.01); *F16K 99/0028* (2013.01); *F16K 99/0048* (2013.01); *F16K 2099/008* (2013.01); *F16K 2099/0073* (2013.01); *F16K 2099/0078* (2013.01)
(58) Field of Classification Search
  CPC ............. F16K 99/0015; F16K 99/0028; F16K 99/0048
  See application file for complete search history.

(56) References Cited

U.S. PATENT DOCUMENTS

| | | | |
|---|---|---|---|
| 4,545,561 A | 10/1985 | Brown | |
| 5,325,880 A | 7/1994 | Johnson | |
| 6,142,444 A | 11/2000 | Kluge | |
| 6,833,180 B1 * | 12/2004 | Kodemura | ............... H01B 1/24 428/323 |
| 10,323,772 B2 | 6/2019 | Huff | |
| 2001/0055812 A1 | 12/2001 | Mian | |
| 2013/0000759 A1 | 1/2013 | Killeen | |

\* cited by examiner

*Primary Examiner* — Reinaldo Sanchez-Medina
*Assistant Examiner* — Nicole Gardner
(74) *Attorney, Agent, or Firm* — Nixon & Vanderhye, P.C.

(57) ABSTRACT

A three-way (3-way) Micro-Electro-Mechanical Systems (MEMS)-based micro-valve device and method of fabrication for the implementation of a three-way MEMS-based micro-valve which uses a single piezoelectric actuator. The present invention has a wide range of applications including medical, industrial control, aerospace, automotive, consumer electronics and products, as well as any application(s) requiring the use of three-way micro-valves for the control of fluids. The present invention allows for the implementation of a three-way microvalve device and method of fabrication that can be tailored to the requirements of a wide range of applications and fluid types. The microvalve may employ a novel pressure-balancing scheme wherein the fluid pressure balances the actuator mechanism so that only a small amount of actuation pressure (or force) is needed to switch the state of the actuator and device from open to closed, or closed to open.

19 Claims, 15 Drawing Sheets

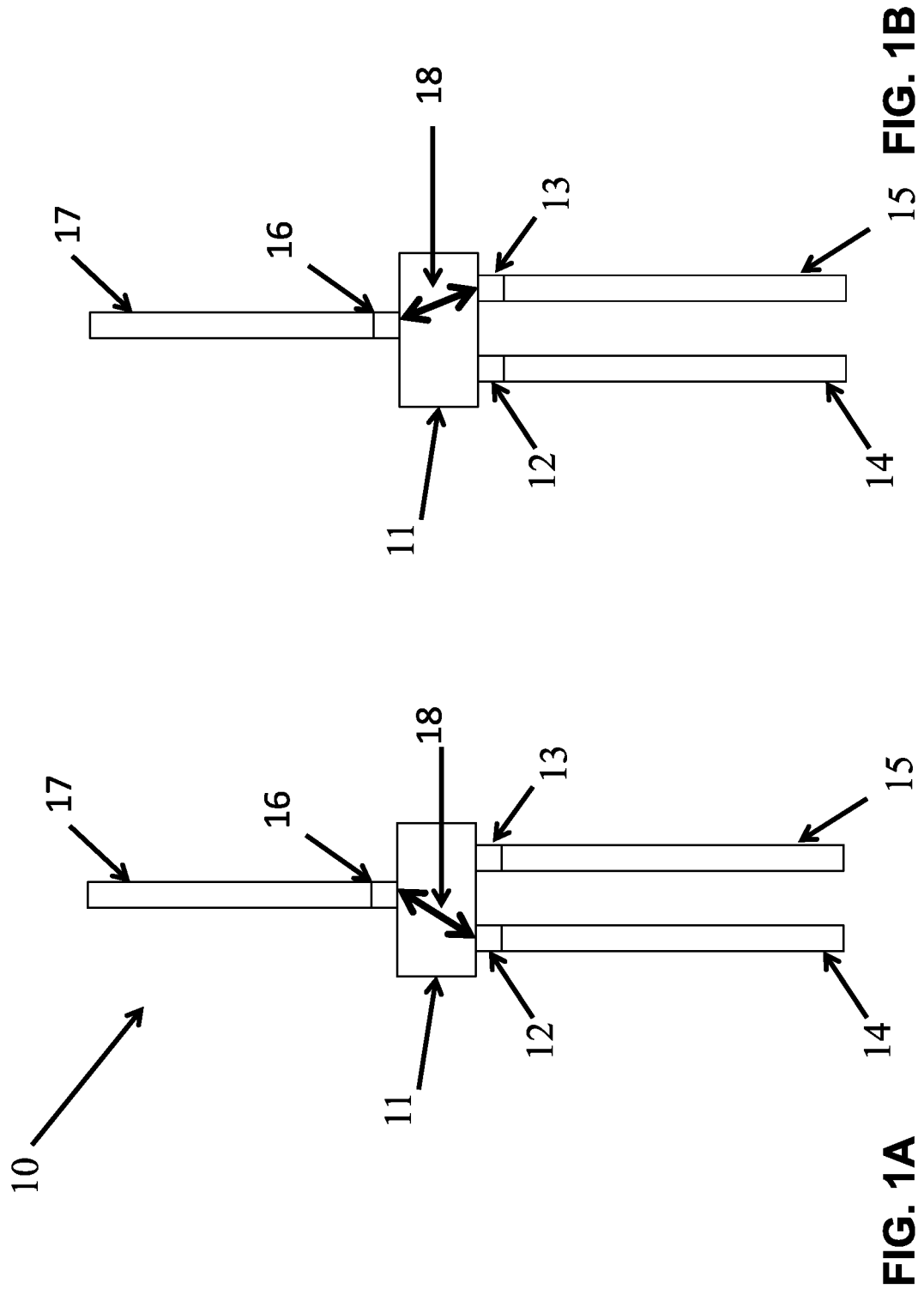

Possible 3-way Microvalve States for 2 inlet ports and 1 outlet port device configuration of Figure 1

| State | Inlet Port 1 | Inlet Port 2 | Outlet Port 3 | Resultant Flow Condition |
|---|---|---|---|---|
| State 1 | on | on | on | Flow from 1 and 2 through 3 |
| State 2 | on | on | off | No flow |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | Flow from 2 through 3 |
| State 8 | off | off | on | No flow |

FIG. 3

Possible 3-way Microvalve States for 1 inlet ports and 2 outlet port device configuration of Figure 2

| State | Inlet Port 1 | Outlet Port 2 | Outlet Port 3 | Resultant Flow Condition |
|---|---|---|---|---|
| State 1 | on | on | on | Flow from 1 through 2 and 3 |
| State 2 | on | on | off | Flow from 1 to 2 |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | No flow |
| State 8 | off | off | on | No flow |

FIG. 4

On State

Actuator (on)

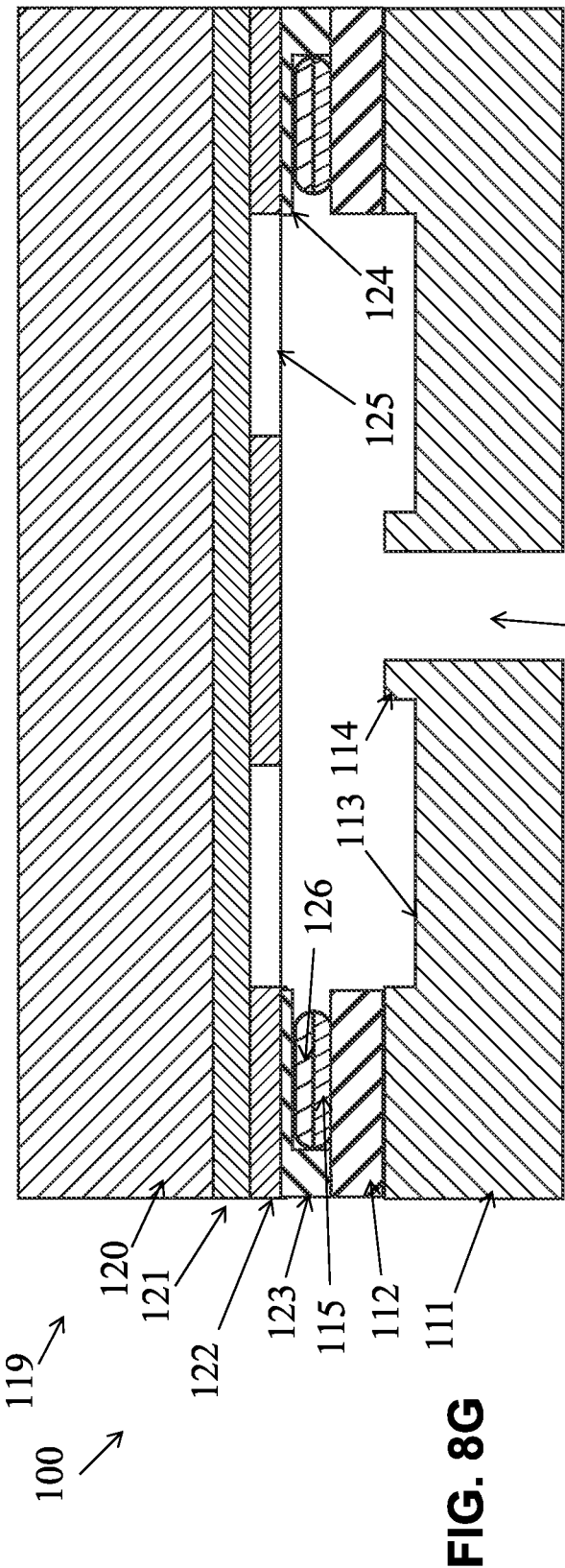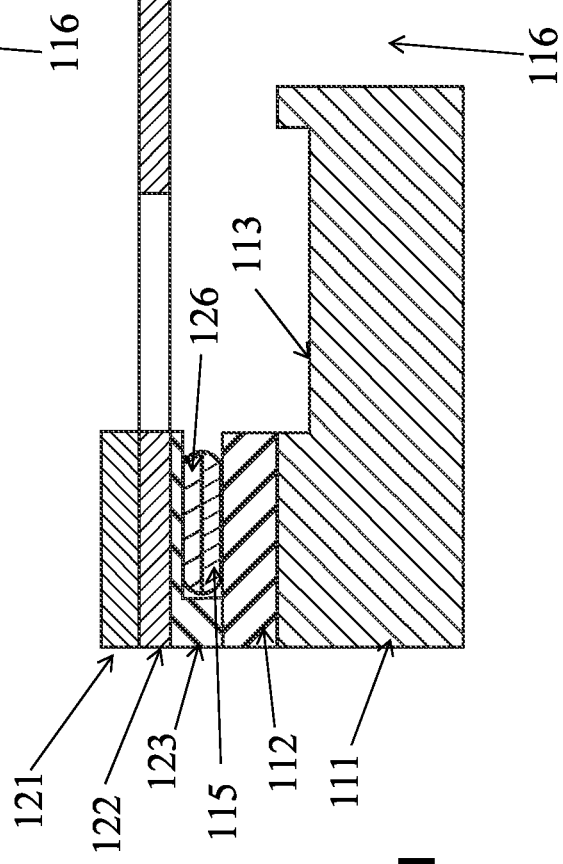
FIG. 8G
FIG. 8H

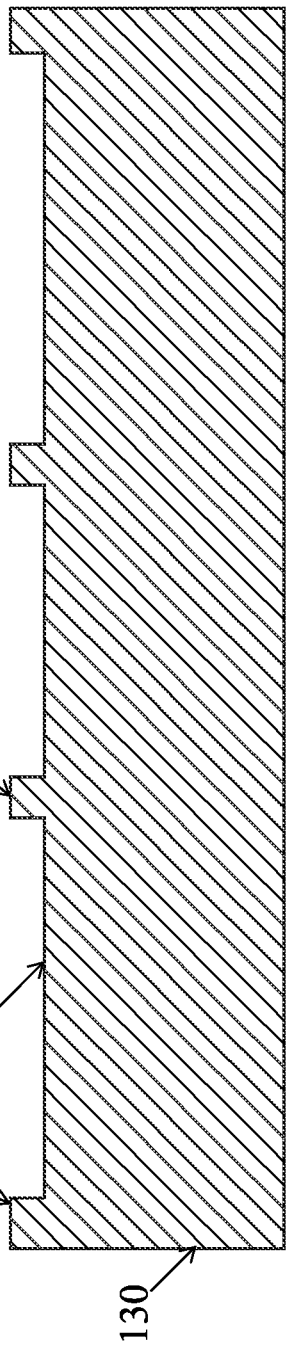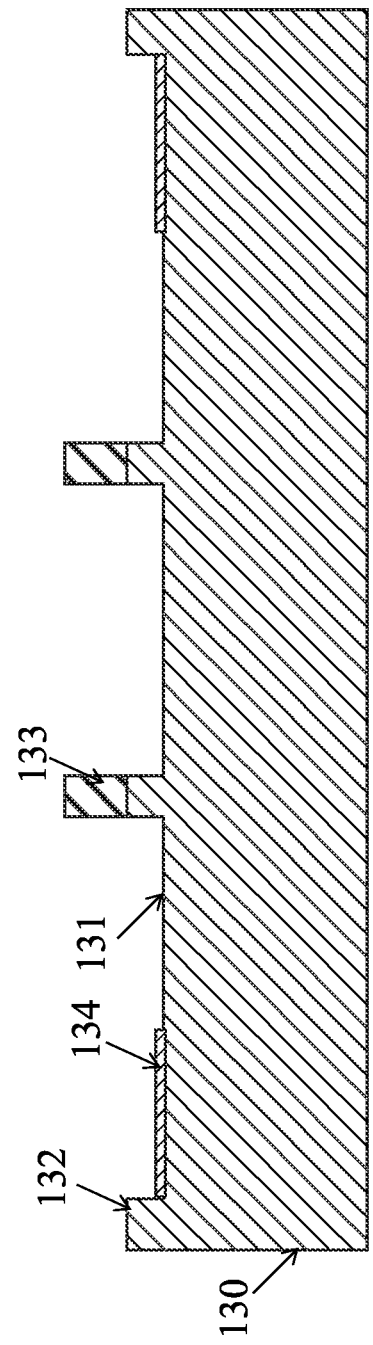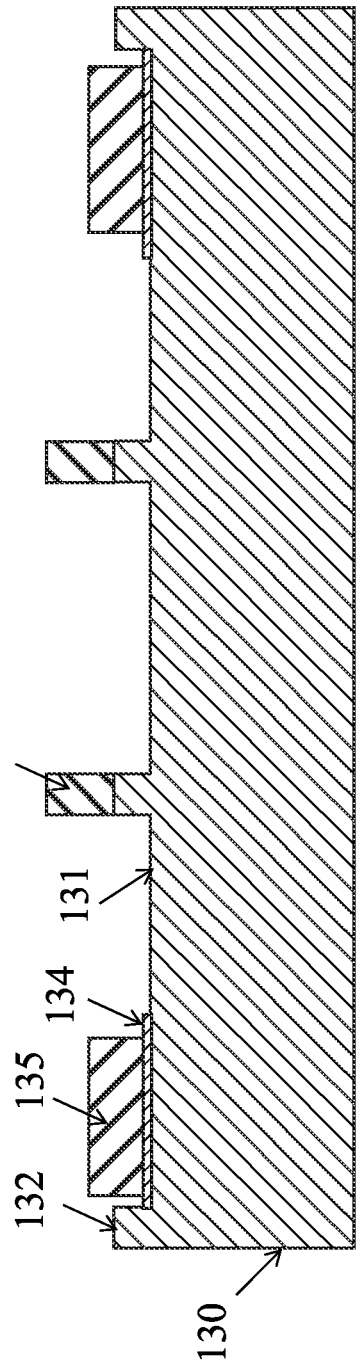

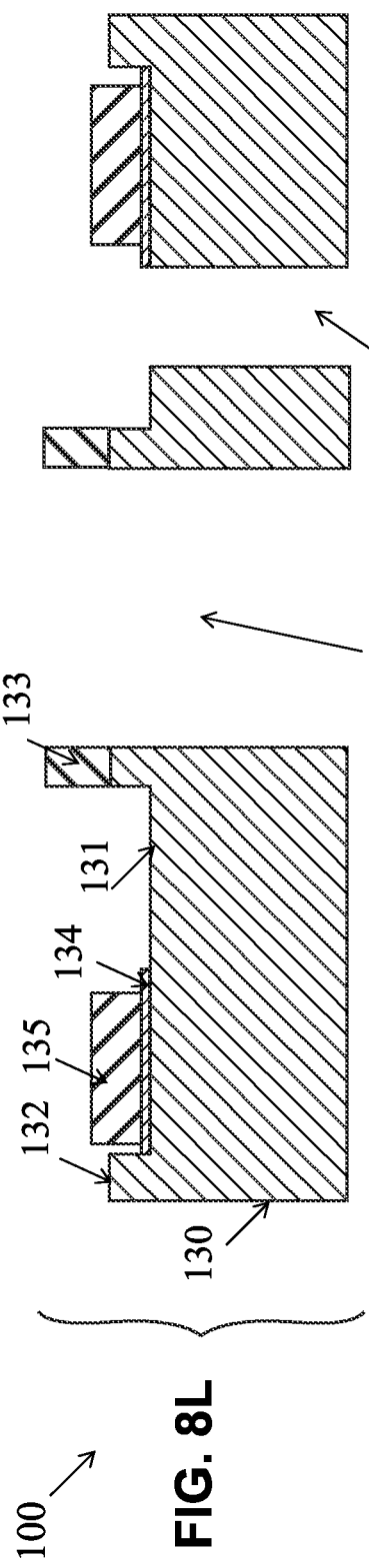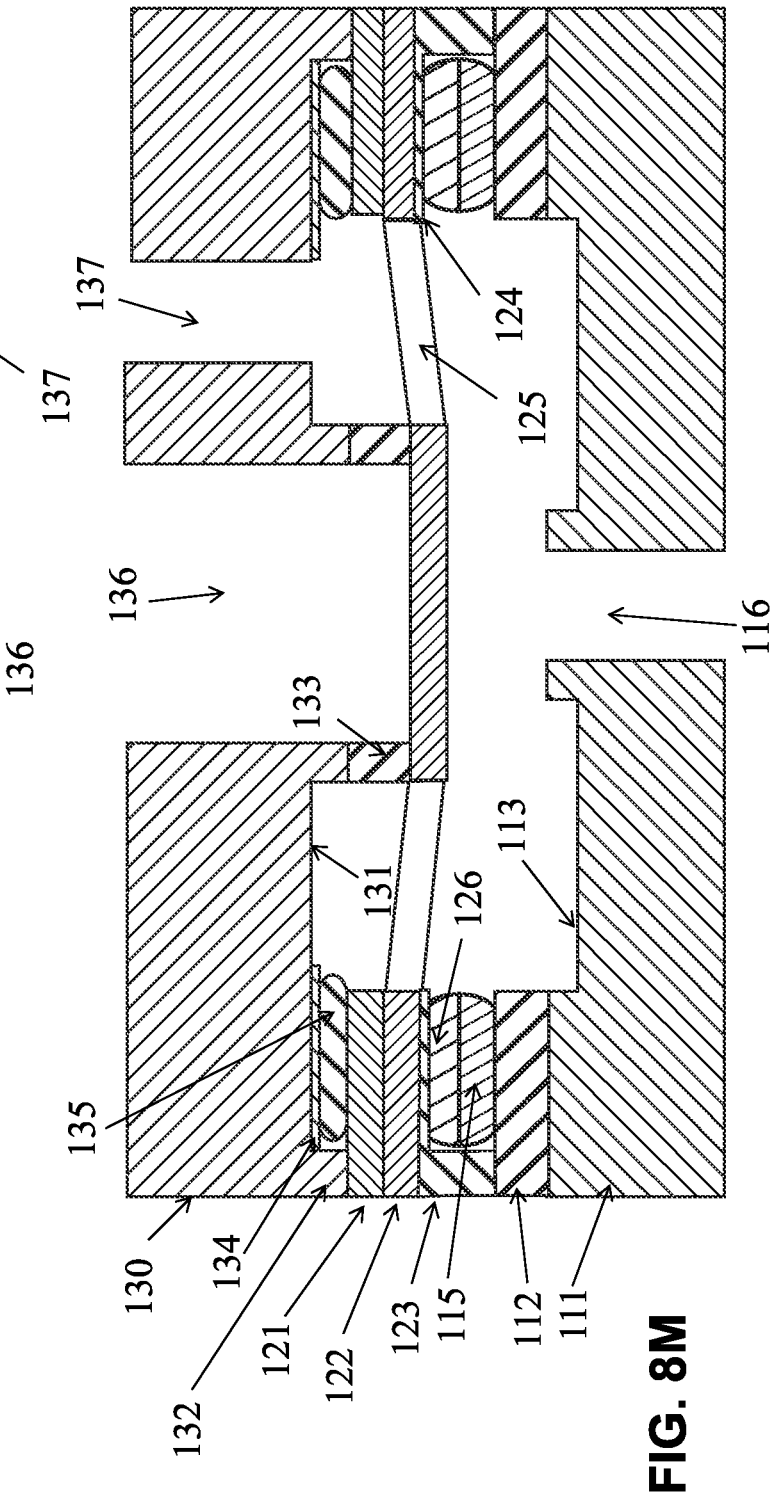

THREE-WAY PIEZOELECTRICALLY-ACTUATED MICROVALVE DEVICE AND METHOD OF FABRICATION

This application is a divisional of U.S. application Ser. No. 15/894,716, filed Feb. 12, 2018, the entire contents of which is hereby incorporated by reference.

This invention was made with government support under FA8651-16-C-0258 awarded by the Air Force. The government has certain rights in the invention.

FIELD OF INVENTION

The present invention is directed to three-way (3-way) Micro-Electro-Mechanical Systems (MEMS)-based microvalve devices that employ piezoelectric actuation and methods of fabrication. The present invention involves a novel feature of using the fluid under control of the microvalve to pressure balance the actuator and thereby enable small actuation forces to open and close the device. This present invention has a wide range of applications including medical, industrial control, aerospace, automotive, consumer electronics and products, as well as any application(s) requiring the use of three-way micro-valves for the control of fluids.

BACKGROUND OF THE INVENTION

A number of MEMS-based microvalves have been reported in the literature using a variety of actuation methods including: pneumatic (see e.g., L. Yobas, F. Lisy, R. Schmidt, M. Huff, "A Pneumatically Actuated Tactile Display Unit Utilizing MEMS Microvalves," 1998 Annual Meeting of the Biomedical Engineering Society, Rehabilitation Engineering Scientific Track, Session on Sensory Aids and Communication, Cleveland Ohio, Oct. 10-13, 1998); electrostatic (see e.g., M. A. Huff, J. R. Gilbert, and M. A. Schmidt, "Flow Characteristics of a Pressure-Balanced Microvalve," The IEEE 7th International Conference on Solid-State Sensors and Actuators, Transducers 93, Yokohama Japan, Jun. 7-10, 1993; L. Yobas, F. Lisy, and M. A. Huff, "Electrostatically Actuated MEMS Microvalve Suitable for Pneumatically Refreshed Braille-Display-System," Submitted to the American Society of Mechanical Engineers, BioEngineering Conference, June 1999, Big Sky, Mont.; L. Yobas, D. Durand, M. Huff, F. Lisy, G. Skebe, "A Novel Integrable Microvalve for Refreshable Braille Display System," IEEE/ASME Journal of MicroElectroMechanical Systems); thermo-pneumatic (see e.g., Zdeblic, M. J. et al., "Thermopneumatically Actuated Microvalves and Integrated Electro-Fluidic Circuits," Technical Digest of the IEEE Solid State Sensor and Actuator Workshop, Hilton Head, S. C., Jun. 13-16, 1994); shape-memory alloy (SMA) (see e.g., H. Kahn, W. Benard, M. Huff, and A. Heuer, "Titanium-Nickel Shape-Memory Thin-Film Actuators for Micromachined Valves," Materials Research Society Symposium Proceedings, 444, presented at Fall MRS meeting, December 1996, Boston, Mass.; K. Nandakumar, A. Parr, M. Huff, and S. Phillips, "A Smart SMA Actuated Microvalve with Feedback Control," ASME MEMS Conference, November 1998); thermal bimetallic (see e.g., K. Nandakumar, A. Parr, M. Huff, and S. Phillips, "A Smart SMA Actuated Microvalve with Feedback Control," ASME MEMS Conference, November 1998); piezoelectric (see e.g., Esashi, M., Shoji, S., and Nakano, A., "Normally Closed Microvalve and Micropump Fabricated on a Silicon Wafer," Proceedings of MEMS '89, $1^{st}$ International Workshop Micro Electromechanical Systems, Salt Lake City, Utah, February 1989); and electromagnetic (see e.g., Yanagisawa, K., Kuwano, H., Tago, A., "An Electromagnetically Driven Microvalve," Proceedings of the IEEE 7th International Conference on Solid-State Sensors and Actuators, Transducers 93, Yokohama Japan, Jun. 7-10, 1993. February 1989).

All of these micro-valves previously reported in the literature have been 2-way devices that can merely "open" or close to allow the device to "turn on" or "turn off" the flow of fluid through the structure. Importantly, none of these devices can be operated as three-way microvalves that can direct the flow of fluid in a preferred direction. This is partly due to the fact that MEMS is in general a relatively new technology, and specifically because MEMS-based microvalves are even less mature. Consequently, the only available method for the implementation of a fluidic system wherein the fluid can be directed to a preferred direction has been to use at least a quantity of at least two (2) separate two-way micro-valves. However, this is an expensive solution that doubles the power required, size, weight and space, as well as reduces reliability, and therefore is not an optimal or preferred solution for many applications.

A major challenge for MEMS-based actuators in general, and microvalves in particular, is the very low actuation forces that can be generated on the small dimensional size scales of the actuator elements. The resulting small actuation forces typically prevent these types of devices to be used where the actuator must overcome larger forces. For example, a typical electrostatically-actuated microvalve will only generate less than a 1 psi (pound per square inch) of actuation pressure. Therefore, if the microvalve actuator must overcome the fluid pressure in order to open and/or close the device to the flow of fluid, then the microvalve would be restricted to applications where the fluid pressures are smaller than the actuation pressure, that is less than 1 psi.

Exemplary embodiments disclosed in this application provide for a three-way microvalve device and method of fabrication that can be tailored to the requirements of a wide range of applications. The 3-way microvalves disclose herein employ piezoelectric actuation, which can generate relatively high actuation forces compared to other methods of actuation used in MEMS devices. This allows the control of much higher fluid pressures. In some of the embodiments disclosed herein, only one piezoelectric actuator stack is required. This configuration may also employ a pressure balancing scheme.

SUMMARY OF INVENTION

The present invention is directed to a three-way (3-way) Micro-Electro-Mechanical Systems (MEMS)-based microvalve device and method of fabrication for the implementation of three-way MEMS-based micro-valves. The present invention has a wide range of applications including medical, industrial control, aerospace, automotive, consumer electronics and products, as well as any application(s) requiring the use of three-way micro-valves for the control of fluids.

A major challenge for MEMS-based actuators in general, and microvalves in particular, is the very low actuation forces that can be generated on the small dimensional size scales of the actuator elements. The resulting small actuation forces typically prevent these types of devices to be used where the actuator must overcome larger forces. For example, a typical electrostatically-actuated microvalve will only generate less than a 1 psi (pound per square inch) of actuation pressure. Therefore, if the microvalve actuator must overcome the fluid pressure in order to open and/or close, then the microvalve would be restricted to applications where the fluid pressures are smaller than the actuation pressure, that is less than 1 psi The present invention allows for the implementation of a three-way microvalve devices and methods of fabrication that can be tailored to the requirements of a wide range of applications and fluid types. Exemplary embodiments of a 3-way microvalves disclosed in this application may employ piezoelectric actuation, but can also use a number of different actuation methods including actuation methods that have very small actuation pressures and energy densities even at higher fluidic pressures enabled by a pressure-balancing scheme wherein the fluid pressure balances the actuator mechanism so that only a small amount of actuation pressure (or force) is needed to switch the state of the actuator and device from open to closed, or closed to open.

BRIEF DESCRIPTION OF THE DRAWINGS

FIGS. 1A and 1B illustrate a three-way microvalve with two inlet ports and one outlet port, and showing two functional states of the device.

FIG. 3 is a table showing the possible states of a three-way microvalve having two inlet ports and one outlet port, which may be applicable to the three-way microvalve of FIG. 1.

FIG. 4 is a table showing the possible states of a three-way microvalve having one inlet port and two outlet ports, which may be applicable to the three-way microvalve of FIG. 2.

In FIG. 5A, the microvalve is shown an un-actuated state with both inlet port one and inlet port two both in an "open" state and connected to the outlet port so that fluid can flow through both of these ports and through the microvalve outlet port. In FIG. 5A the device is shown in an actuated state with inlet port two in an "open" state and connected to the outlet port thereby allowing fluid to flow through inlet port two, through the microvalve, and through the outlet port. In FIG. 5B, inlet port one is in a "closed" state and does not allow fluid to flow through this port. In FIG. 5B the microvalve device is shown in the alternative actuated state with inlet port one "open" and connected to the outlet port whereby fluid is allowed to flow through inlet port one, through the microvalve, and through the outlet port. In FIG. 5B, inlet port two is in a "closed" state and does not allow fluid to flow through this port.

In FIG. 6A, the microvalve is shown an un-actuated state with inlet port one in an "open" state and connected to the outlet port thereby allowing fluid to flow through inlet port one, through the microvalve, and through the outlet port. In this state, inlet port two is in a "closed" state and no fluid can flow through this port. In FIG. 6B, the microvalve is shown actuated state with inlet port two in an "open" state and connected to the outlet port thereby allowing fluid to flow through inlet port two, through the micro-valve, and through the outlet port. In this alternative state, inlet port one is in a "closed" state and no fluid can flow through this port.

In FIG. 7A, the microvalve is shown an un-actuated state with inlet port one in an "open" state and connected to the outlet port thereby allowing fluid to flow through inlet port one, through the microvalve, and through the outlet port. In this state, inlet port two is in a "closed" state and no fluid can flow through this port. In FIG. 7B the device is shown actuated state with inlet port two in an "open" state and connected to the outlet port thereby allowing fluid to flow through inlet port two, through the microvalve, and through the outlet port. In this state, inlet port one is in a "closed" state and no fluid can flow through this port.

FIGS. 8A-8M illustrate a cross section of the fabrication process of the bottom substrate and the movable membrane used for implementation of the pressure-balanced, electrostatically-actuation three-way microvalve.

DETAILED DESCRIPTION OF THE INVENTION

Figure 2B:
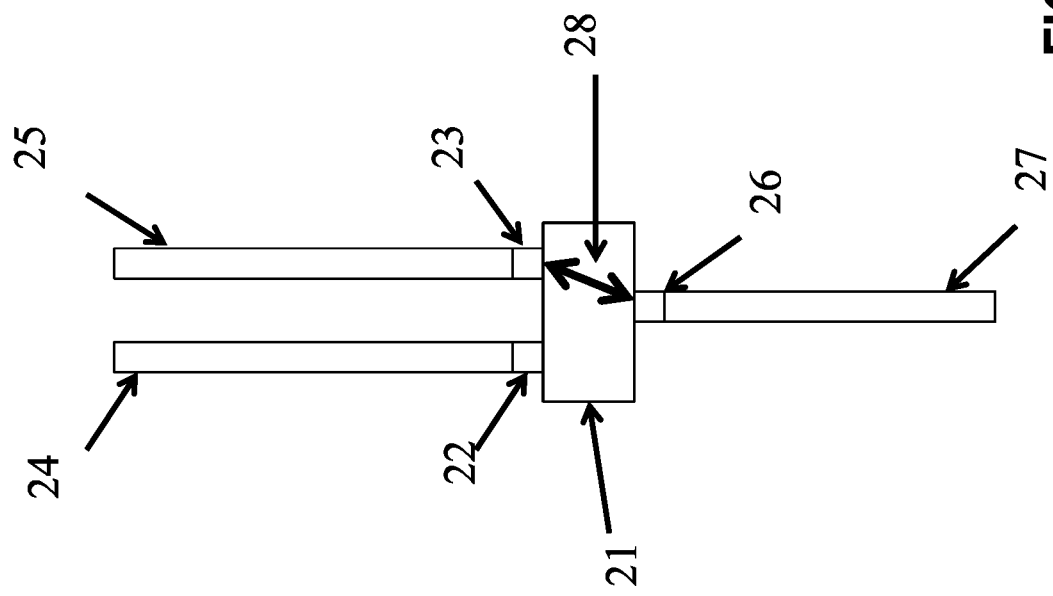
FIGS. 2A and 2B illustrate a three-way microvalve with one inlet port and two outlet ports, and showing two functional states of the device.

The present invention is directed to three-way (3-way) Micro-Electro-Mechanical Systems (MEMS)-based microvalve devices and methods of fabrication for the implementation of a three-way MEMS-based micro-valve. The present invention has a wide range of applications including medical, industrial control, aerospace, automotive, consumer electronics and products, as well as any application(s) requiring the use of three-way micro-valves for the control of fluids.

The present invention allows for the implementation of three-way microvalve devices and methods of fabrication that can be tailored to the requirements of a wide range of applications and fluid types. The three-way microvalves we disclose herein use piezoelectric actuation, but can also use a number of other different actuation methods including actuation methods that have very small actuation energy densities even at higher fluidic pressures. This is enabled by a novel pressure-balancing scheme wherein the fluid pressure balances the actuation so that only a small amount of actuation force or pressure is needed to switch the state of the actuator and device, even when the fluid pressure is much larger than the pressure that can be generated by the actuator.

FIGS. 1A, 1B, 2A, and 2B illustrate the functionality of the three-way microvalve of the present invention. The microvalve has three (3) fluidic ports (openings into or out of the device structure through which fluid [either gas or liquid or a combination of gas and liquids] can flow) with two (2) different microvalve device configurations, with the first device configuration shown in FIGS. 1A and 1B and the second in FIGS. 2A and 2B.

In one microvalve device configuration 10 as shown in FIGS. 1A and 1B, the microvalve device 11 has two inlet fluidic ports, inlet port one, numbered 12, and inlet port two, numbered 13, that are used as inlet ports thereby allowing fluid to flow into the microvalve. That is, fluid can flow into the microvalve device 11 through these inlet ports 12 and 13, through the microvalve 11, and into, and through the remaining port, outlet port three, numbered 16, if these ports are in an "open" state.

Inlet port one, numbered 12, is connected to inlet fluid conduit 14 that is a fluid pathway into inlet port one 12 and the microvalve device 11 in FIGS. 1A and 1B. Outlet port three, numbered 16, is connected to outlet fluid conduit 17 that is a fluid pathway out of the microvalve device 11. Inlet port two, numbered 13, is connected to fluid conduit 15 and is a fluid pathway into inlet port two 13 and the microvalve 11.

The microvalve device 11 shown in FIGS. 1A and 1B has a fluidic switching mechanism 18 whereby either inlet port one, numbered 12, or inlet port two, numbered 13, is connected to outlet port three, numbered 16. This fluidic switching mechanism 18 is shown in two of the switched states with the first switched state illustrated in FIG. 1A wherein inlet port one, numbered 12, is fluidically connected to outlet port three, numbered 16. That is, fluid can flow from conduit 14, through inlet port one 12, through the microvalve 11, through the outlet port 16, and subsequently through conduit 17. In the state shown in FIG. 1A, inlet port two, numbered 13, is not connected to outlet port three, numbered 16. That is, no fluid is allowed from conduit 15, through the inlet port two and into the microvalve 11, and therefore no fluid can flow through conduit 17 from inlet port two 13.

In the second switched state, shown in FIG. 1B, inlet port two, numbered 13, is fluidically connected to outlet port three, numbered 16 by the fluid switch 18 of the microvalve 11. That is, fluid can flow from conduit 15, through the inlet port two 13, through the microvalve 11, through the outlet port 16, and subsequently through conduit 17. In the state shown in FIG. 1B, inlet port one, numbered 12, is not connected to outlet port three, numbered 16. That is, no fluid is allowed from conduit 14, through the inlet port one and into the microvalve 11, and therefore no fluid can flow through conduit 17 from inlet port one 12.

Figure 2A:
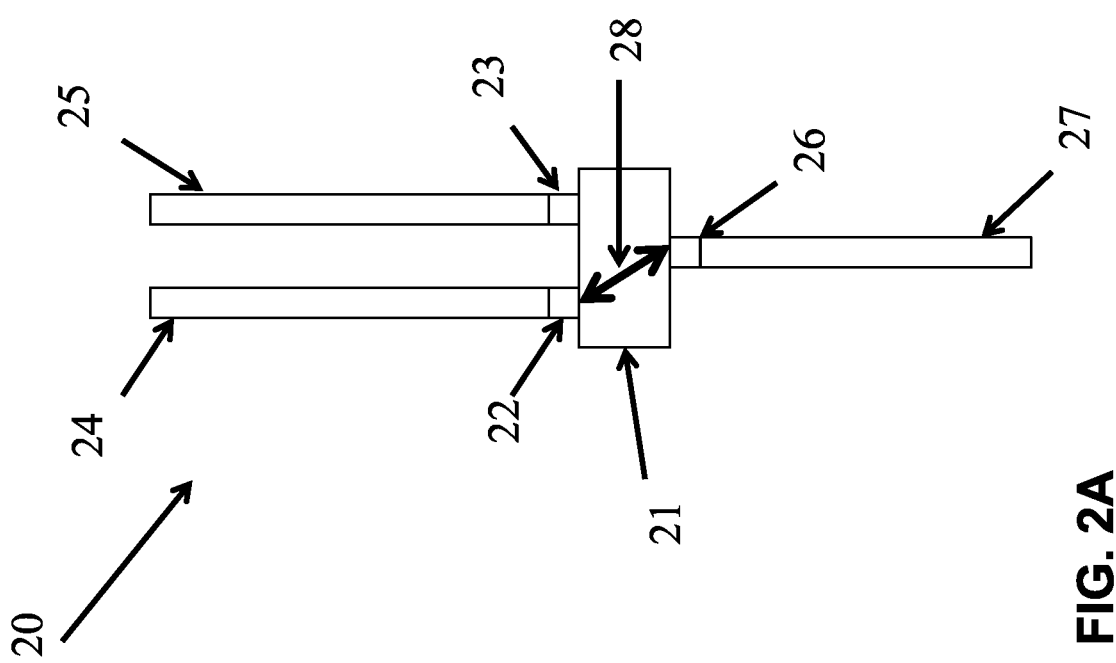

In the second device configuration, as shown in FIGS. 2A and 2B, the microvalve device 21 has one inlet fluidic port, inlet port one, numbered 26, that is used as an inlet port, that is, fluid can flow into the microvalve device 21 through this inlet port 26. There are two outlet fluidic ports, with outlet port one numbered 22, and outlet port two numbered 23. These outlet ports 22 and 23 are used as outlet ports 22 and 23 whereby fluid can flow out of the microvalve device 21 that entered through inlet port one 26. Inlet port one, numbered 26, is connected to inlet fluid conduit 27 that is a fluid pathway into the microvalve device 21. Outlet port one, numbered 22, is connected to outlet fluid conduit 24 that is a fluid pathway out of the microvalve device 21. Outlet port two, numbered 23, is connected to outlet fluid conduit 25 that is a fluid pathway out of the microvalve device 21.

The microvalve device 21 shown in FIGS. 2A and 2B has a switching mechanism 28 whereby the inlet port, numbered 26, is connected to either outlet port one, numbered 22, or outlet port two, numbered 23.

This switching mechanism 28 is shown in two states with the first switched state illustrated in FIG. 2A wherein the inlet port, numbered 26, is fluidically connected to outlet port one, numbered 22. That is, fluid can flow from conduit 27, through the inlet port 26, through the microvalve 21, through the outlet port one 22, and subsequently through conduit 24. In the state shown in FIG. 2A, the inlet port, numbered 26, is not connected to outlet port two, numbered 23. That is, no fluid is allowed from conduit 27, through the microvalve 21, and through conduit 25.

In the second switched state shown in FIG. 2B, the inlet port, numbered 26, is fluidically connected to outlet port two, numbered 23, by the microvalve 21 switch mechanism 28. That is, fluid can flow from conduit 27, through the inlet port 26, through the microvalve 21, through the outlet port two 23, and subsequently through conduit 25. In the state shown in FIG. 2B, inlet port one, numbered 26, is not connected to outlet port one, numbered 22. That is, no fluid is allowed from conduit 27, through the microvalve 21, and through conduit 24.

As can be seen from FIGS. 1A, 1B, 2A, and 2B, the microvalve is able to control the direction of the fluid from the inlet port(s) and conduit(s) to the outlet port(s) and conduit(s).

In general, the 3-way microvalve of the device configuration of FIGS. 1A and 1B, with two inlet ports and one outlet port, will have several possible states as shown in the table 30 of FIG. 3 depending on which of the inlet ports and outlet port are either in an "on" or "off" state. As can be seen, five (5) of these states are essentially equivalent in that no fluid is allowed to flow through the microvalve device. Specifically, these are states 2, 3, 4, 5, and 8. Additionally, state 1 wherein fluid flows through the device with all ports open is not of much interest since this state can be obtained without the presence of a valve by just having a branching from port 1 to ports 2 and 3. The two (2) states of primary interest are states 6 and 7 whereby the fluid can from inlet port 1 to outlet port 3 in State 6 and State 7 where the fluid can from inlet port 2 to outlet port 3.

Similarly, the 3-way microvalve of the device configuration of FIGS. 2A and 2B, with one inlet port and two outlet ports, also has several possible states as shown in the table 40 of FIG. 4 depending on which of the inlet ports and outlet port are either in an "on" or "off" state. As in the previous case there are five (5) states that allow no fluid to flow through the device. Specifically, these are states 3, 4, 5, 7, and 8. Additionally, state 1 wherein fluid flows through the device with all ports open is not of much interest since this state can be obtained without the presence of a valve by just having a branching from ports 1 and 2 to port 3. The two (2) states of primary interest are states 2 and 6 whereby the fluid can from inlet port 1 to outlet port 2 in State 2 and State 6 where the fluid can from inlet port 1 to outlet port 3.

It is important to note that valves in general, and microvalves in particular, may not exhibit all of these states shown in FIGS. 3 and 4. The ability for these devices to exhibit specific states is dependent on the specific design of the device, method of actuator, as well as other factors. Nevertheless, as noted above, many of the states are redundant (e.g., the no flow states) or have no particular interest in applications (e.g., the state with all ports open) and therefore the ability of a microvalve device to exhibit less than all possible states is not limiting in most applications.

Another differentiating element of 3-way microvalves is whether they are "normally open" or "normally closed." "Normally open" and "normally closed" describe the state or position of the valve when no actuation signal is applied to the device. That is, the natural or resting state of the device when no electrical power is applied to the device's actuator. Typically, a "normally closed" device would employ some kind of spring or mechanical force that results in the valve port or ports being closed when no power is applied to the microvalve actuator. Conversely, a "normally open" microvalve's ports are open when no power is applied. Whether the microvalve is normally "open" or normally "closed" will depend on the exact design of the microvalve as well as the application requirements. The 3-way microvalves of the present invention can be implement in both the "normally open" or "normally closed" device configurations.

Typically, the actuation method employed in any microvalve design is dictated by the requirements of the intended application. Typically these requirements would include:

maximum flow rate, maximum pressure differential, operating temperatures, electrical power; size and weight; type of fluid to be controlled; as well as other factors.

The specific device requirements of a particular application will typically allow the number of viable actuation methods to be reduced. For example, in applications where the operational temperatures are relatively low or vary over a large range, the use of any type of thermally-initiated actuation methods such as thermal bimetallic, shape-memory alloy (SMA), and thermo-pneumatic may not be a good choice since all of these methods require heating of the actuator, and additionally, the actuator itself is temperature sensitive.

For example, shape-memory alloy and thermo-pneumatic actuators operate by heating an actuator material to induce a phase change and therefore the phase change temperature would have to be higher than the maximum operational temperature. Therefore, the operational temperatures are an important determiner of the choice of actuation method. Nevertheless, thermally-initiated actuation methods may have some significant advantages in some applications. For example, shape-memory alloy (SMA) actuators have several advantages compared to other actuation schemes including: the actuation energy densities of SMA actuators are typically very high compared to other actuation methods and this allows the control of fluids are large pressure differentials; and the maximum allowable mechanical strains of SMA actuators are also very high (i.e., some SMA actuators have reported repeatable strain levels of around 8%) thereby enabling larger strokes and consequently larger flow rates at modest differential pressures. Thermo-pneumatic actuators also have very high actuation energy densities, but typically do not have large strokes since it is considered prudent to limit the strain levels of the materials used in the actuator to below 1%.

Often a very important criterion for selection of actuation method is the power requirements for the specific application. For example, for some applications the heating requirements of thermal-actuation methods may exceed the device power requirements.

Additionally, pneumatic actuation approaches wherein an external pressure generator is required to provide pressures to actuate the device will increase the size (and power requirements) of the device considerably. Therefore, for some applications pneumatic actuation may not be an optimal approach.

Electromagnetic actuation is a popular method of actuation in macro-scale valves, but this type of actuation does not scale well to the MEMS size domain. Many MEMS-based electromagnetic actuation schemes require a meso-scale electromagnetic solenoid that must be attached to the valve mechanism and this increases the cost and size of the system considerably and therefore this actuation method may not be desirable for some applications. Alternatively, some MEMS-based electromagnetic actuation schemes attempt to integrate wire windings into the device structure, but this makes the fabrication very challenging and the maximum current that can be safely passed through small wires often limits the electromagnetic forces that can be generated using this approach.

Electrostatic and piezoelectric actuation methods are often employed for microvalve devices. However, it is important to note that both of these approaches have small inherent strokes. That is, the amount of deflection of the actuator during actuation is relatively small. The consequence of this is that the fluidic resistance of the microvalve in the open state is high. In most design configuration reported, the valve opening due to the small stroke ranges from, for example, a few microns to about 10 microns.

The resultant effect of a small stroke of the microvalve is that the fluid flow pressure through the opening will be high in order to flow resistance created by the small stroke and therefore this may limit the amount of fluid flow through the device when the microvalve is in an "open" state.

In the case of piezoelectric actuation, the issue of small actuator displacement, or stroke, can be overcome to some degree by using a stacked piezoelectric actuator configuration. This is one approach taken in some example embodiments that are described below.

Another important point about electrostatic actuation is that the actuation energy densities or actuation pressures that can be generated using this actuation method are very small. For example, an electrostatic microactuator usually generates only around 0.5 to 1 pounds per square inch (psi) of actuation pressure. This can be scaled to the area of the actuator to determine the force level in Newtons. In comparison, it is not unusual for macro-scale actuators to be able to generate tens to hundreds of psi in actuation pressure. The consequence of this is that a device using this actuation scheme may not be able to operate, that is actuate to open and/or close, at differential fluid pressures higher than can be generated by the actuator.

Piezoelectric actuation schemes on the other hand, can generate very large actuation energy densities and therefore can be used in applications requiring operation at high differential fluid pressures. Typically, electrostatic actuation schemes are simpler to implement compared to piezoelectric actuation schemes. In fact, as a general rule electrostatic-based actuation schemes will be the simplest to implement since it requires no additional or exotic materials such as in the case for shape-memory alloys, thermo-pneumatics, bimetallics, and piezoelectrics.

The important point about actuation schemes for MEMS-based microvalves is that the requirements of the specific application will often dictate the type of actuator that can be used. The three-way microvalve devices disclosed herein of the present invention can be used with any of the available actuation schemes.

Figure 5A:
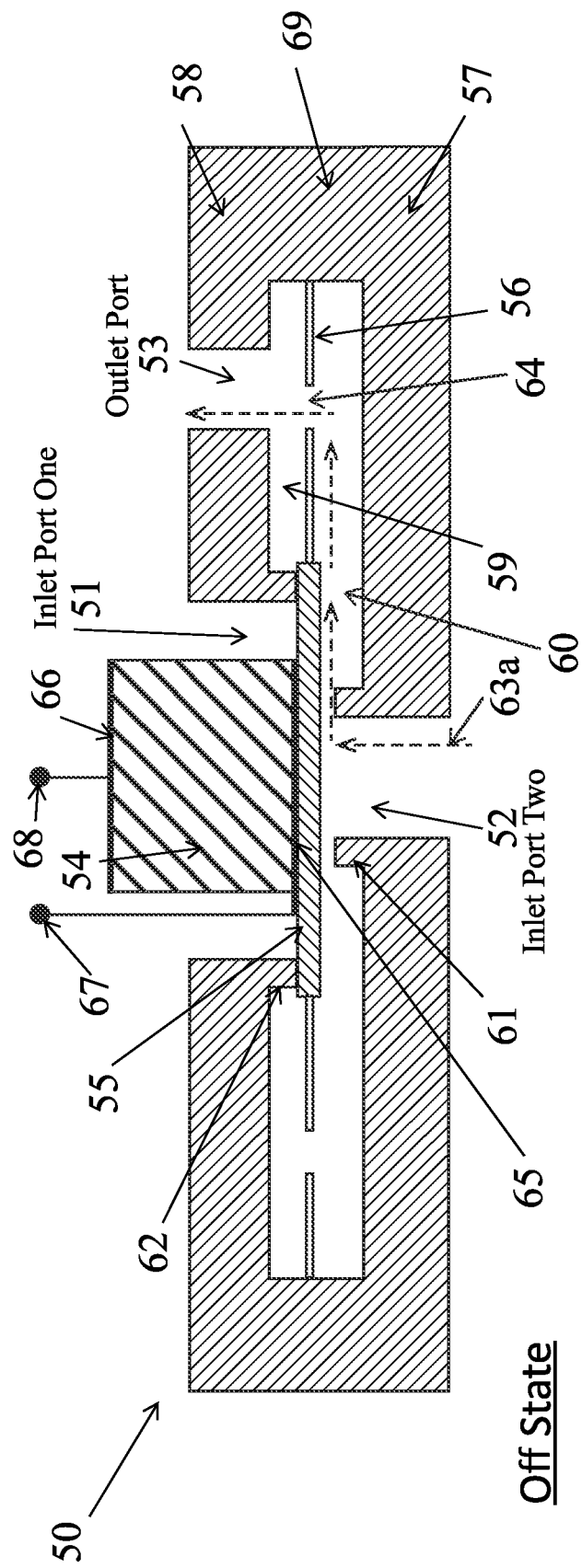
FIGS. 5A and 5B illustrate a cross section of a pressure-balanced, normally-open, electrostatically-actuated, three-way microvalve with two inlet ports and one outlet port.
Figure 5B:
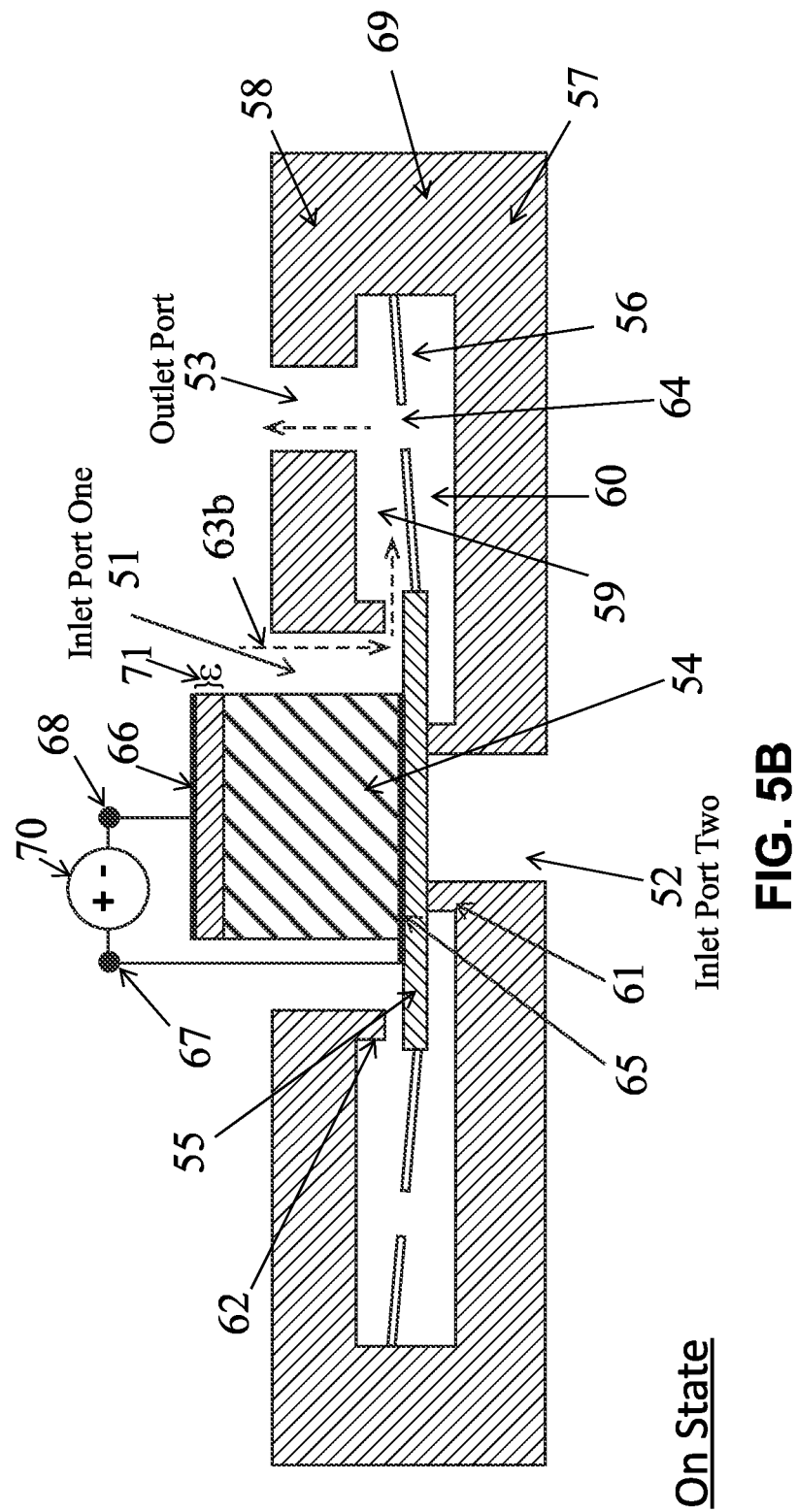

An exemplary embodiment of a three-way microvalve 50 is shown in FIGS. 5A and 5B. The three-way microvalve 50 shown in FIGS. 5A and 5B is piezoelectrically-actuated and also pressure-balanced as described herein. Most notably, the embodiment of the microvalve shown in FIG. 5 can include only a single actuator in order to function as a three-way microvalve.

The microvalve 50 of FIGS. 5A and 5B uses an externally-made piezoelectric stack actuator 54 that is attached to the microvalve plunger plate 55. The use of this actuator 54 allows large displacements (e.g., 5 to 10 microns or more depending on the number of stacked elements in the piezoelectric actuator) of the plunger plate 55 thereby enabling the fluid flow resistance through the device to be lowered. The actuator 54 also generates a large amount of force (e.g., hundreds of Newtons) that can be used to control fluids at higher pressures.

The microvalve 50 shown in FIGS. 5A and 5B is shown as a cross sectional diagram. The microvalve 50 shown in FIGS. 5A and 5B, is circularly symmetric, but is not so limited. In some embodiments, the microvalve 50 could be square shaped or rectangular shaped without changing the features disclosed herein.

The microvalve 50 in FIG. 5A, is shown in the un-actuated state, that is, with no power applied to the piezoelectric actuator 54. Therefore, this state is called the "off"

state. The microvalve 50 is shown in FIGS. 5A and 5B without the surrounding packaging with associated inlet and outlet fluid ports in order to simplify the illustration.

The microvalve 50 has two inlet ports, inlet port one 51 and inlet port two 52. There is one outlet port 53. In the un-actuated state shown in FIG. 5A, the microvalve 50 has inlet ports two 52 fluidically connected to the outlet port 53. The inlet port one 51 is closed in the un-actuated state of FIG. 5A. The inlet and outlet ports may be sized so that they contribute a minimal flow resistance to the flow of fluid through the microvalve when they are in an open state. In one embodiment, the cross section of the openings in both inlet ports is equal. In another embodiment, the cross section of one or more inlet port(s) and the outlet port is equal. In another embodiment, the cross section of openings in each port of the microvalve is equal.

The microvalve 50 shown in FIG. 5A may be composed of a bottom substrate layer 57 a top substrate layer 58, and a middle substrate layer 69. However, it should be noted that the actual number of layers will depend on the fabrication process used to implement the device and therefore it is possible to implement the invention disclosed herein using more or less layers. The microvalve device 50, has an upper fluidic chamber 59 and a lower fluidic chamber 60.

Inside the upper and lower flow chambers 59 and 60 of the microvalve 50, the middle layer 56 is made thinner and essentially is a membrane 56 that is mechanically compliant. That is, the membrane 56 can be deflected under the action of an actuation force of sufficient magnitude. The membrane 56 has openings 64 that penetrate completely through the membrane layer 56 for the purpose of fluidically connecting the upper 59 and lower 60 fluid chambers to allow fluid to pass through the membrane 56 from one chamber to the other. These openings 64 in the membrane are located approximately halfway the distance inside the flow chambers 59 and 60.

The microvalve 50 shown in FIG. 5A has sealing rings (or surfaces or valve seats), 61 and 62, whose purpose is to reduce or eliminate leakage of fluid through the ports when the valve is in a closed position. Additionally, the sealing rings may provide for a reduced surface area in contact with the microvalve plunger plate and thereby reduce stiction effects from reducing the performance of the device. The sealing rings may also be designed so that they represent the major component of the flow resistance of the microvalve when in the open state.

The piezoelectric actuator 54 is positioned on the microvalve plunger plate 55 and is shown in an un-actuated state in FIG. 5A. The microvalve 50 piezoelectric actuator 54 has electrodes on at least two sides of the piezoelectric actuator 54 as shown in FIG. 5A that are labeled for the top electrode 66 and the bottom electrode 65, respectively. These electrodes are connected to electrical terminals to the top 66 and bottom 65 electrodes with a top terminal 68 and a bottom terminal 67, respectively. The top 68 and bottom 67 terminals are shown with no voltage applied in FIG. 5A since the microvalve 50 is in an unactuated or off state.

As shown in FIG. 5A, inlet port one 51 is closed to the flow of fluid. Inlet port two 52 is open to the flow of fluid. This fluid flow is illustrated by dotted lines with arrows 63a. In the un-actuated state, the fluid entering inlet port one 52 flows over the sealing rings 61 and into the lower microvalve flow chamber 60. The fluid flow 63a continues through the lower flow chamber 60 until it reaches the openings 64 in the membrane 56 whereupon the fluid flow 63a passes from the lower flow chamber 60 into the upper flow chamber 59. The fluid flow 63a then passes through the outlet port 53 of the microvalve 50 to exit the device.

It should be noted that the upper flow chamber 59 and lower flow chamber 60 have approximately the same area on the top and bottom portions of the membrane 56 and valve plunger plate 55. This combined with the openings 64 in the membrane 56 mean that the fluid pressure inside the microvalve 50 will result in approximately equal forces on both the top and bottom surfaces of the membrane 56 and valve plunger plate 55 with the net result that the fluid pressure essentially is balanced on the membrane 56 and plunger plate 55. This has important implications since it means the piezoelectric actuator 54 employed on the microvalve is not required to have sufficient actuation force to overcome the fluid pressure inside the microvalve device thereby allowing the microvalve 50 to be actuated using a smaller actuation force than otherwise. With pressure balancing of the fluid on the membrane 56 and plunger plate 55, the actuation 54 employed needs to only overcome the mechanical stiffness of the membrane 56. This feature allows the microvalve 50 to be useful for the control of fluids even when the piezo-lectric actuator 54 employed is capable of generating forces smaller than the fluid pressures.

An actuated state of the microvalve is shown in FIG. 5B. An applied voltage potential 70 is applied across electrical terminals 67 and 68 connected to the top electrode 66 and the bottom electrode 65, respectively.

When an electrical voltage potential 70 is applied across the terminals 67 and 68 of the microvalve 50 as shown in FIG. 5B, the piezoelectric actuator 54 will develop a strain, given by $\varepsilon$ 71, that results in a net elongation or expansion of the piezoelectric actuator 54 wherein the strain 71 is given by the ratio of the change in length $\Delta L$ of the actuator and its un-actuated length L, or $\varepsilon=\Delta L/L$.

The strain 71 in the piezoelectric actuator 54 in the actuated state as shown in FIG. 5B will result in a displacement of the microvalve plunger 55 downward if the piezoelectric actuator 54 is constrained by a top rigid surface (not shown in FIG. 5A or 5B, but will be shown in later figures). The displacement of the microvalve plunger 55 as shown in FIG. 5B, when the microvalve 50 is actuated or on, results in the inlet port two 52 changing from being open to fluid flow to a state where inlet port two 52 is closed to the fluid flow.

Simultaneously, when the microvalve plunger 55 is moved downward in the actuated or on state as shown in FIG. 5b, the inlet port one 51 changes from a closed state to an open state, whereby fluid could not flow in the closed state to where fluid can flow in the open state.

The fluid flow 63b in the actuated or on state shown in FIG. 5B enters the inlet port one 51, travels over the top sealing ring 62, through the upper flow chamber 59 of microvalve 50 and then through the outlet port 53 to exit the microvalve 50.

As noted in FIGS. 5A and 5B, the 3-way functionality is implemented in the microvalve 50 design according to the diagram of FIGS. 1A and 1B. As noted in FIG. 1A, inlet fluid port 12 and tubing 14 is fluidically connected to the outlet port 16 and tubing 17. This is, in the state shown in FIG. 1A, the fluid can flow from inlet port 12 through the microvalve 11 and then through the outlet port 16. Simultaneously, in the state shown in FIG. 1A, inlet fluid port 13 and tubing 15 are closed and no fluid can flow from this inlet fluid port 13 and tubing 15, through the microvalve 11, and to the outlet fluid port 16 and tubing 17.

This is the same functionality of the microvalve shown in FIG. 5A, where inlet port two 52 is open to the flow of fluid 63a and the fluid flow 63a passes through the microvalve 50 and exits the microvalve 50 through the outlet port 53. Simultaneously, inlet port one 51 is closed and no fluid can flow through this port 51 and through the microvalve 50 to exit the outlet port 53.

In the other state of the microvalve shown in FIG. 1B, inlet fluid port 13 and tubing 15 is fluidically connected to the outlet port 16 and tubing 17. This is, in the state shown in FIG. 1B, the fluid can flow from inlet port 13 through the microvalve 11 and then through the outlet port 16. Simultaneously, in the state shown in FIG. 1B, inlet fluid port 12 and tubing 14 are closed and no fluid can flow from this inlet fluid port 12 and tubing 14, through the microvalve 11, and to the outlet fluid port 16 and tubing 17.

This is the same functionality of the microvalve shown in FIG. 5B, where inlet port one 51 is open to the flow of fluid 63b and the fluid flow 63b passes through the microvalve 50 and exits the microvalve 50 through the outlet port 53. Simultaneously, inlet port two 52 is closed and no fluid can flow through this port 52 and through the microvalve 50 to exit the outlet port 53.

It should also be noted that the microvalve device 50 shown in FIG. 5 can be configured by making the outlet port 53 an inlet port, inlet port 51 into an outlet port and inlet port 52 into an outlet port, and thereby implement the functionality of the 3-way microvalve shown in FIGS. 2A and 2B.

While the piezoelectric actuator 54 is illustrated in FIG. 1 as being provided in a portion of the inlet port one 51, embodiments of this disclosure are not so limited and may be provided in other portions of the microvalve. In some exemplary embodiments, the piezoelectric actuator may be provided in a surface of the chamber that is not part of the inlet or outlet port. In other embodiments, the piezoelectric actuator may be provided in the other ports (e.g., inlet port two 52).

Figure 6A:
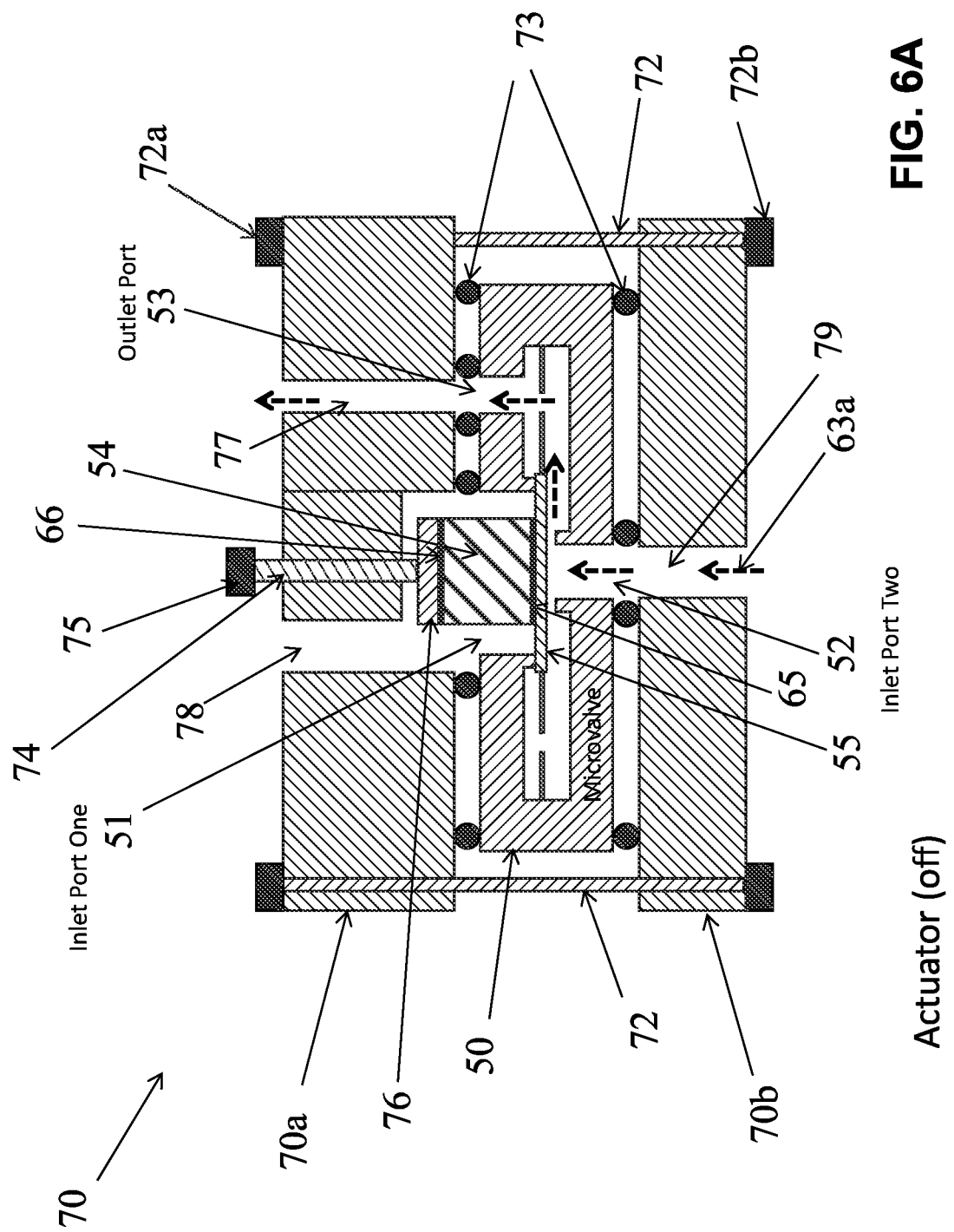
FIGS. 6A and 6B illustrate a cross sectional drawing of a pressure-balanced, normally-closed, electrostatically-actuated, three-way microvalve with two inlet ports and one outlet port.

The microvalve 50 in a fixture 70 is shown in FIG. 6A. Gaskets or o-rings 73 that are mechanically compliant are placed between the sealing surfaces on the microvalve 50 at locations where the inlet ports 51 and 52 and the outlet port 53 in the microvalve 50 are positioned and aligned with the fluid flow pathways in the fixture, including the inlet ports 78 and 79 and the outlet port 77 in the fixture 70, to make a fluidic seal around the inlet 51 and 52 ports and outlet port 53 on the microvalve 50 and the inlet ports 78 and 79 and the outlet port 77 on the fixture 70.

Figure 6B:
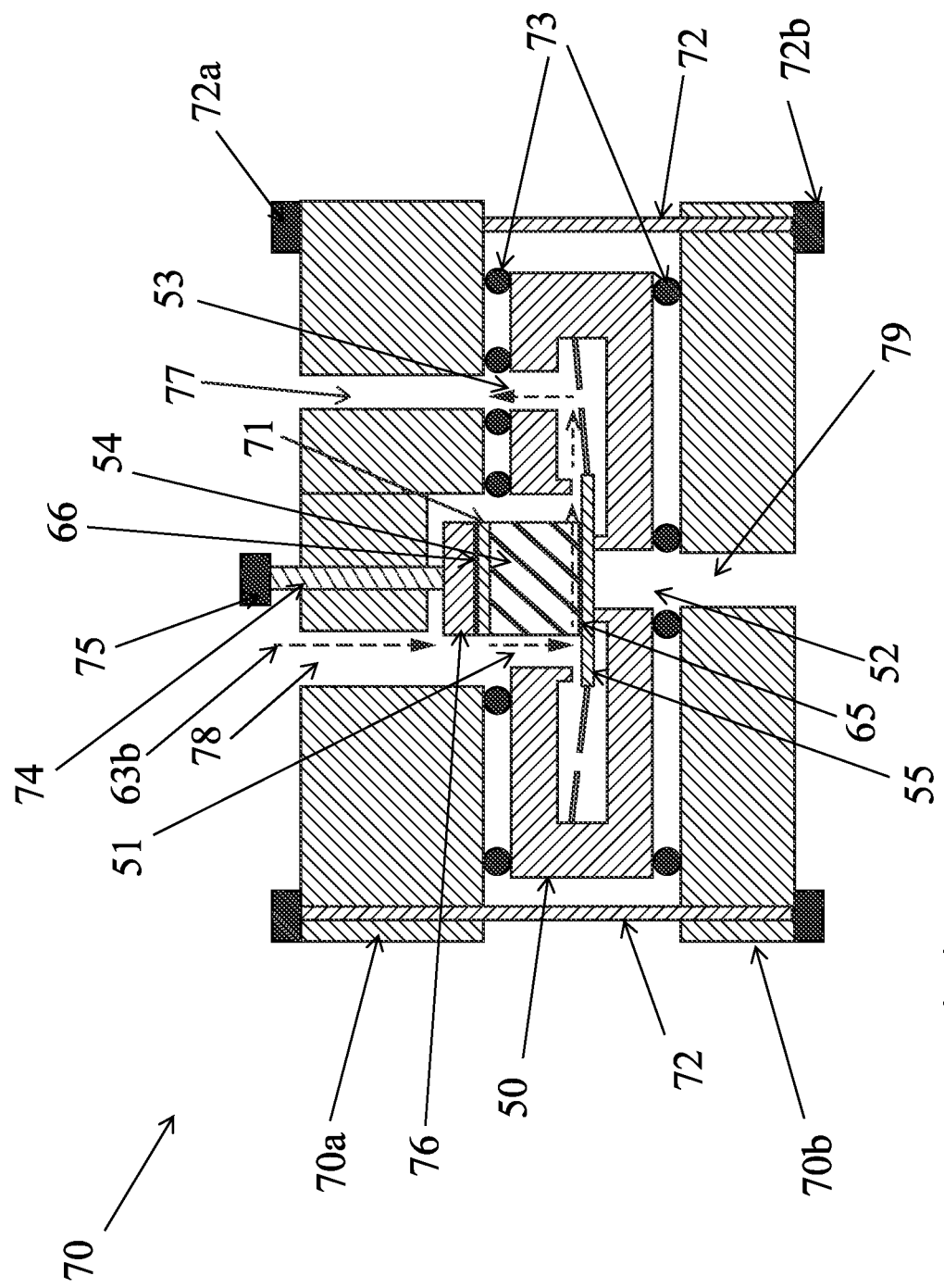

The fixture 70 has top and bottom sections 70a and 70b that have the inlet ports 78 and 79 outlet port 77 machined as shown in FIGS. 6A and 6B. As shown in FIGS. 6A and 6B, there are attachment mechanisms 72 that are placed on the fixture 70 that are terminated by adjustment mechanisms 72a and 72b.

The microvalve 50 shown in FIGS. 6A and 6B employ an adjustment mechanism 74 and 75 composed of an fine-grooved adjustment threaded screw 74 with a turn knob 75 on the side extending from the fixture 70 that can be turned so as to extend the length of the threaded screw 74 so as to remove any spacing between the microvalve piezoelectric actuator 54 and the fixture 70 and thereby allowing the piezoelectric actuator 54 a surface that remains rigid onto which to apply force when actuated. Any force applied by the piezoelectric actuator 54 will be directed to the microvalve plunger plate 55. As shown in FIGS. 6A and 6B, a rigid piece 76 may extend over the top surface of the piezoelectric actuator 54 so as to apply the force generate by the piezoelectric actuator 54 uniformly over the piezoelectric actuator 54 surface.

The microvalve 50 shown in FIG. 6A is in an un-actuated or off state as shown in FIG. 5A, except in the case of FIG. 6A, the microvalve 50 is placed in a fixture 70 to facilitate making fluidic connections to the inlet ports 51 and 52 and the outlet port 53 of the microvalve 50.

In the un-actuated state of FIG. 6A, the piezoelectric actuator 54 has no applied voltage. In the state shown in FIG. 6A, the microvalve inlet port 1, 51 is closed to the flow of fluid, and inlet port 2, 52 is open to the flow of fluid. The fluid flow 63a into inlet port 2, 52, passes through the inlet port 79 opening in the fixture 70 and into and through the microvalve inlet port 2, 52, passes over the lower sealing ring 61, through the lower flow chamber 60 through the opening 64 in the membrane 56 between the flow chambers and into the upper flow chamber 59 and exits through the microvalve 50 outlet port 53.

The microvalve 50 in the fixture 70 in the actuated state is shown in FIG. 6B. As shown in FIG. 5b, the actuator 54 in the actuated state has a voltage potential 70 applied to the two electrodes 65 and 66 of the microvalve 50 piezolectric actuator 54. This results in a strain 71 or expansion of the piezoelectric actuator 54. Since the piezoelectric actuator 54 is rigidly held against the adjustment mechanism 74, 75 and 76, the elongation 71 of the piezoelectric actuator 54 results in a force applied to the microvalve plunger plate 55 thereby causing the plunger plate to move downward as shown in FIG. 6b. This opens the inlet port one 51 of the microvalve 50 to the flow of fluid and closes the inlet port two 52 to the flow of fluid.

In the actuated or on state of FIG. 6B, the microvalve 50 has inlet port 51 open to the fluid flow 63b. The flow of fluid 63b enters the inlet port 78 of the fixture 70, and passes through the fixture 70 and into the inlet port one 51 of the microvalve 50. The flow of fluid 63b then passes over the upper sealing ring 62 of the microvalve 50 and through the upper flow chamber 59 of the microvalve, and then exits through the outlet port 53 in the microvalve. The fluid flow 63b then exits through the outlet port 77 in the fixture.

It should be noted that the electrical connections to the actuator are not shown in FIGS. 6A and 6B to simplify these drawings, but can be understood as illustrated in FIGS. 5A and 5B.

As can be understood and appreciated, the microvalve 50 in the fixture 70 shown in FIGS. 6A and 6B embodies the functionality of the microvalve shown in FIGS. 1A and 1B.

Figure 7A:
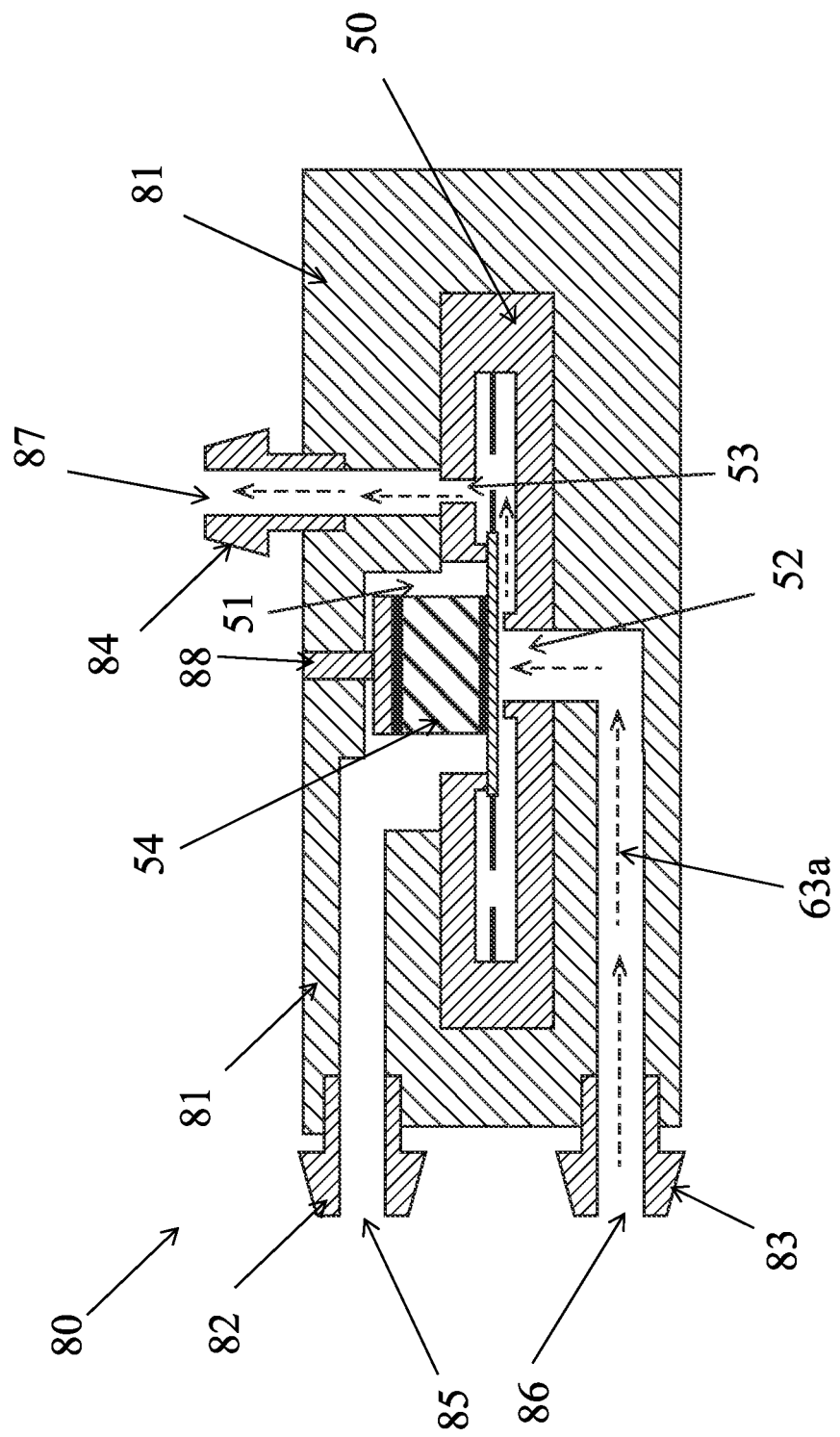
FIGS. 7A and 7B illustrate a cross sectional drawing of a pressure-balanced, normally-closed, piezoelectrically-actuated, three-way microvalve with two inlet ports and one outlet port.
Figure 7B:
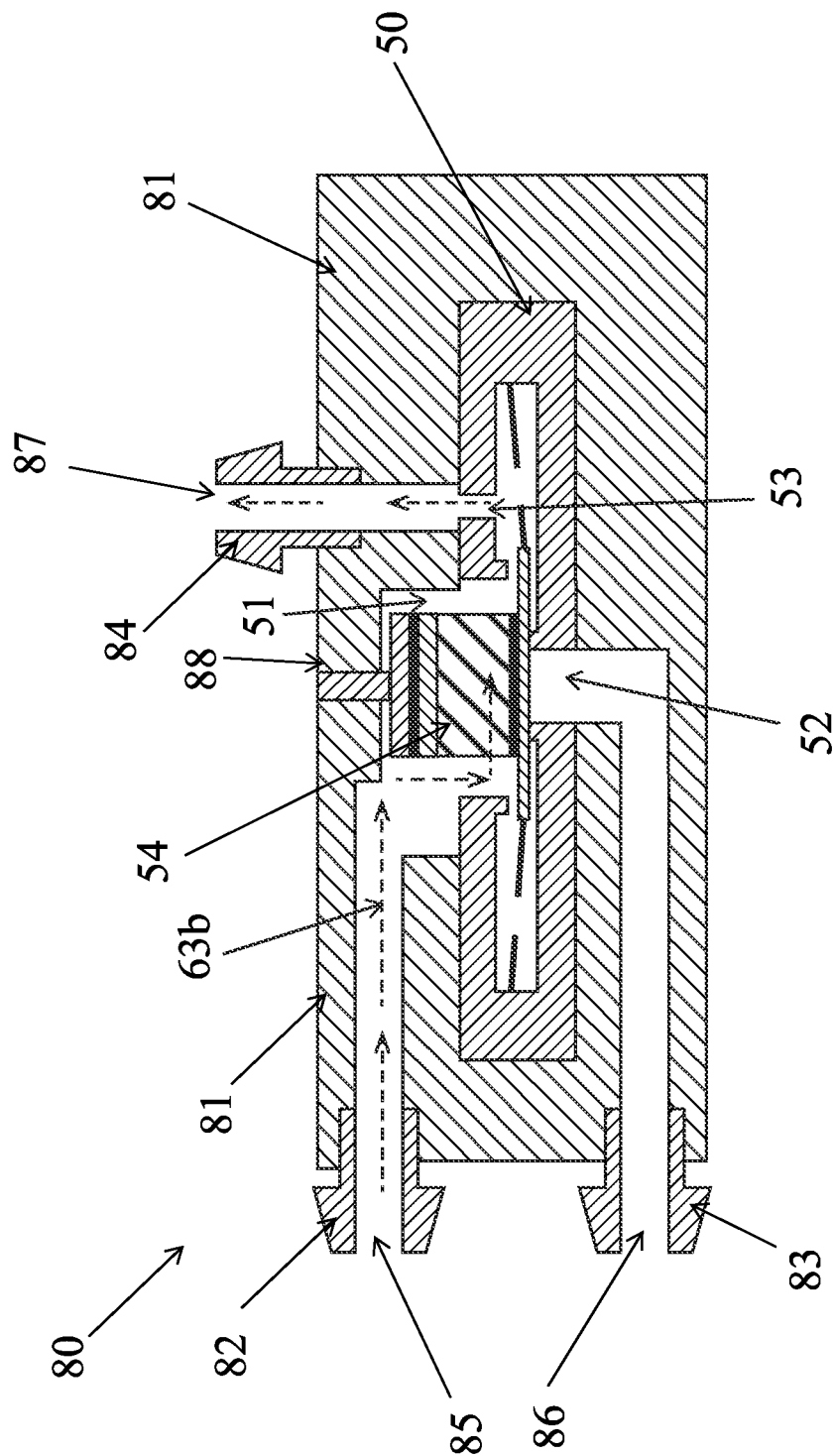

Another configuration of the microvalve 50 is shown in FIGS. 7A and 7B. In these Figures, the microvalve 50 is shown in a package 80. The package 80 housing that encapsulates 81 the microvalve 50 can be fabricated of any suitable material such as a polymer, ceramic or metal. The package housing 81 has 3 ports. There are two inlet ports 82 and 83 and one outlet port 84. These ports may be constructed of a lure-configuration to aid in attaching tubing to the package 80 in order to facilitate making fluidic connections to the package 80 and microvalve 50.

The inlet ports of the package housing 81 directly fluidically connect to the microvalve inlet ports 51 and 52 shown in FIGS. 5A and 5B. And, the outlet port of the packaging housing 81 directly fluidically connects to the microvalve outlet port 53 as shown in FIGS. 5A and 5B.

There is an adjustment fine-threaded screw mechanism 88 to allow any gap between the microvalve 50 piezolectric actuator 54 and a rigid plate 76 to be removed so that when the piezoelectric actuator 54 is actuated it will result in a displacement of the microvalve 50 plunger plate 55.

The microvalve shown in FIG. 7A is in an unactuated or off state, whereby the flow of fluid 63a from inlet port 1, 51 is closed and inlet port two 52 is open to fluid flow 63*a*. In this state, fluid can flow 63*a* into the packaging inlet port 83 opening 86 through the fluidic flow pathways in the packaging housing 81 and into the microvalve inlet port 52. The fluid then can flow 63*a* through the microvalve 50 device and exit through the outlet port 53 of the microvalve 50 and then outward through the outlet port 84 opening 87 to completely exit the package 80. In the state shown in FIG. 7A, the fluid cannot flow through the other inlet port 82 opening 85 of the packaging housing 81 and exit the outlet port 84 opening 87 of the packaging housing 81. That is, the inlet port 82 opening 85 is closed to the flow of fluid.

The microvalve shown in FIG. 7B is in an actuated or on state, whereby the flow of fluid 63*b* from inlet port 2, 52 is open and inlet port one 51 is closed to fluid flow 63*b*. In this state, fluid can flow 63*b* into the packaging inlet port 82 opening 85 through the fluidic flow pathways in the packaging housing 81 and into the microvalve inlet port one 51. The fluid then can flow 63*b* through the microvalve 50 device and exit through the outlet port 53 of the microvalve 50 and then outward through the outlet port 84 opening 87 to completely exit the package 80. In the state shown in FIG. 7B, the fluid cannot flow through the other inlet port 83 opening 86 of the packaging housing 81 and exit the outlet port 84 opening 87 of the packaging housing 81. That is, the inlet port 83 opening 86 is closed to the flow of fluid.

It should be noted that in both FIGS. 7A and 7B that the electrical connections to the piezoelectric actuator 54 are not shown in order to reduce the complexity of these drawings.

Figure 8A:
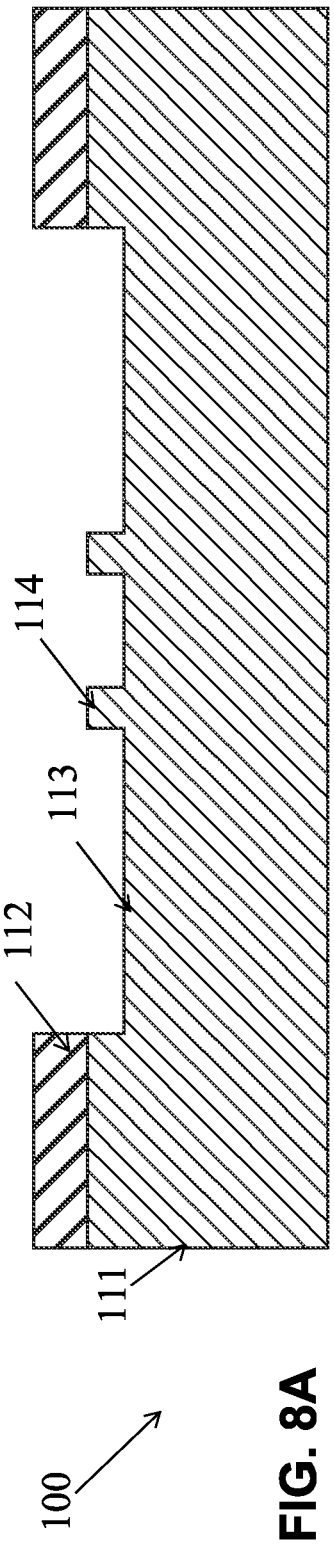

A fabrication process 100 for implementation of the 3-way microvalve is shown in FIGS. 8A-M. The process starts with a bottom prime silicon wafer 111 in FIG. 8A. A layer of a material such as a deposited silicon dioxide layer 112 or silicon oxy-nitride layer 112 is deposited on the top surface of the silicon wafer 111.

A photolithography is performed on the surface of the deposited silicon dioxide layer 112 or silicon oxy-nitride layer 112. Then an etch, preferably a reaction ion etch (RIE), is performed through the deposited silicon dioxide layer 112 or silicon oxy-nitride layer 112 to reach the silicon substrate 111 surface. The photoresist (not shown) is stripped.

A second photolithography is performed on the surface of the silicon substrate 111. This pattern will be used to define the lower flow chamber 113 of the microvalve 50 and make the lower sealing rings 114 of the microvalve 50. A deep reactive ion etch (DRIE) of the silicon substrate 111 surface is then performed to form the lower flow chamber 113 of the microvalve 50 and make the lower sealing rings 114 of the microvalve 50. The photoresist (not shown) is then stripped.

Figure 8B:
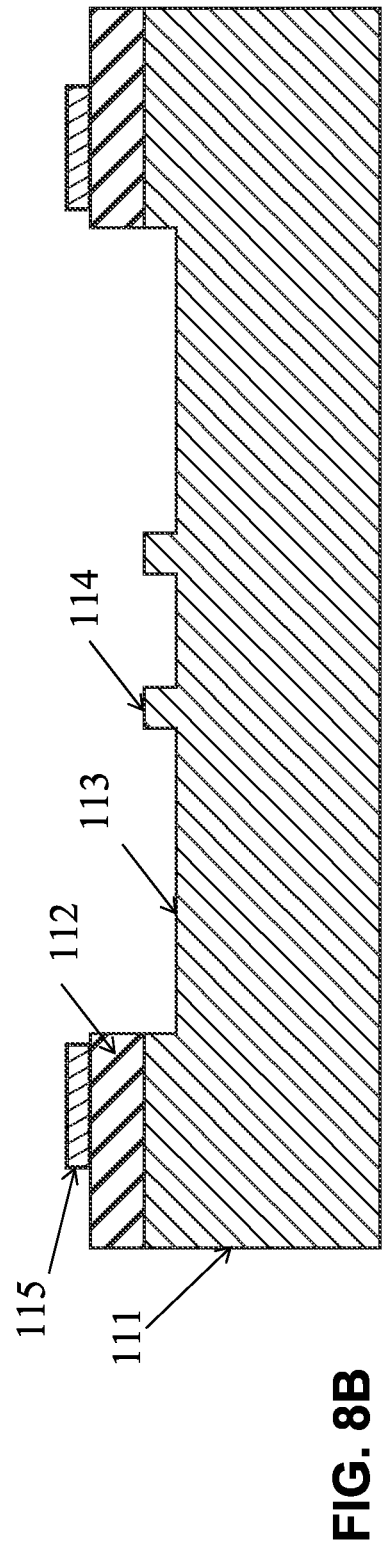

In FIG. 8B, the next process step is to perform a lift-off procedure whereby a photolithography is performed with open areas corresponding where a gold layer 115 will be deposited. After the photolithography, a physical vapor deposition of gold 115 is performed. When the photoresist is removed, the result is the patterning of the deposited gold layer 115 as shown in FIG. 8B. Alternatively to depositing gold, an alloy of gold and tin can be deposited, or an alloy of gold and indium. Pure indium could also be used as well as any suitable intermediary layer used for wafer thermo-compression bonding.

Figure 8C:
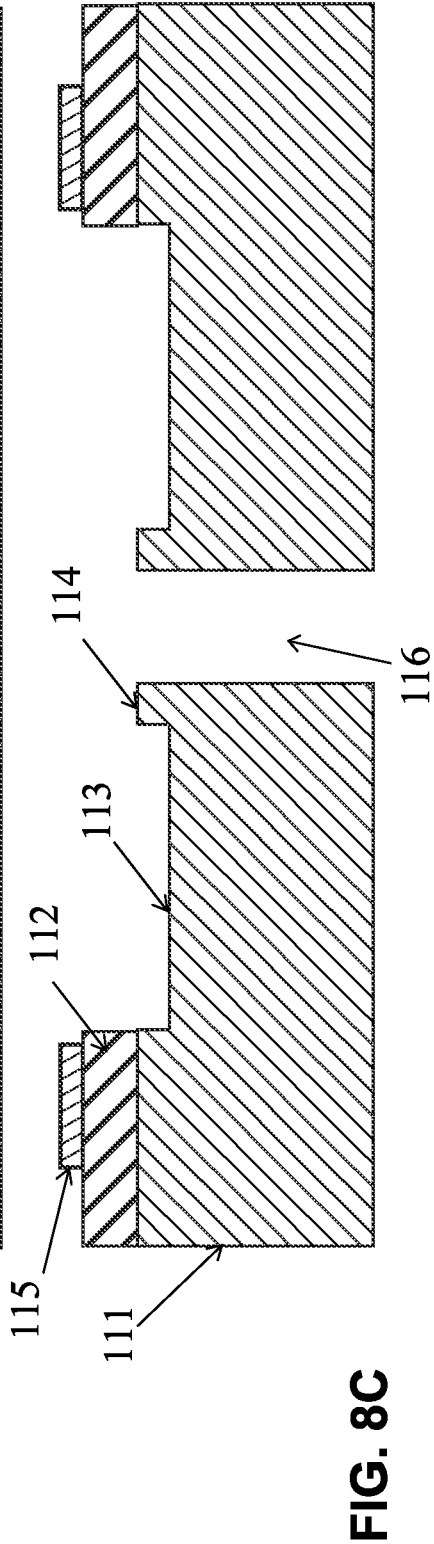

Next, photolithography is performed on the backside of the silicon substrate 111. This pattern will be used to make the fluid inlet port 52 on the underside of the microvalve. A DRIE etch is then performed on the backside of the substrate 111 completely through the substrate 111 creating a flow pathway 116 from the bottom of the wafer 111 to the top of the wafer 111 as shown in FIG. 8C. This flow pathway 116 is used to make the inlet port 52 on the backside of the bottom wafer 111.

A middle silicon substrate 119 is also processed. This substrate 119 is a silicon-on-insulator (SOI) type that is composed of a single crystal handle wafer 120, a silicon dioxide layer 121 on top of the silicon handle wafer 120, and a device layer 122 of single crystal silicon on top of the silicon dioxide layer 121.

On the SOI wafer 119, a material layer 123 of silicon dioxide layer or silicon oxy-nitride layer is deposited onto the top of the silicon dioxide layer or silicon oxy-nitride layer 123 on the device layer 122 of the SOI wafer 119. A photolithography is then performed on the top of the silicon dioxide layer or silicon oxy-nitride layer 123 on the SOI wafer 119 for the purpose of patterning the silicon dioxide layer or silicon oxy-nitride layer 123. After the photolithography is completed, a RIE etch is performed on the silicon dioxide layer or silicon oxy-nitride layer 123 to create standoffs 123 on the top of the SOI wafer 119 that will be used to define the separation between the wafers during a subsequent bonding step. Subsequently, the photoresist is removed.

Figure 8D:
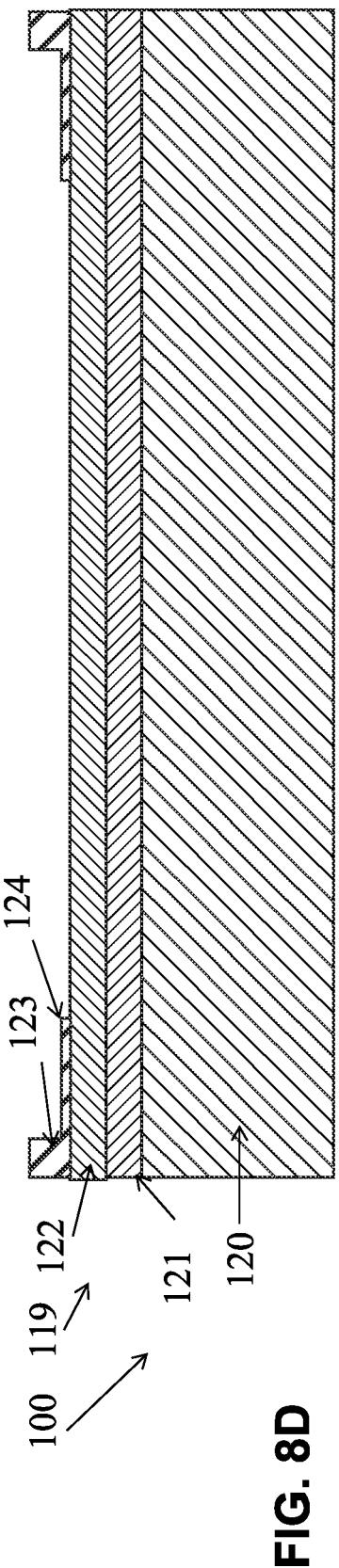
Figure 8E:
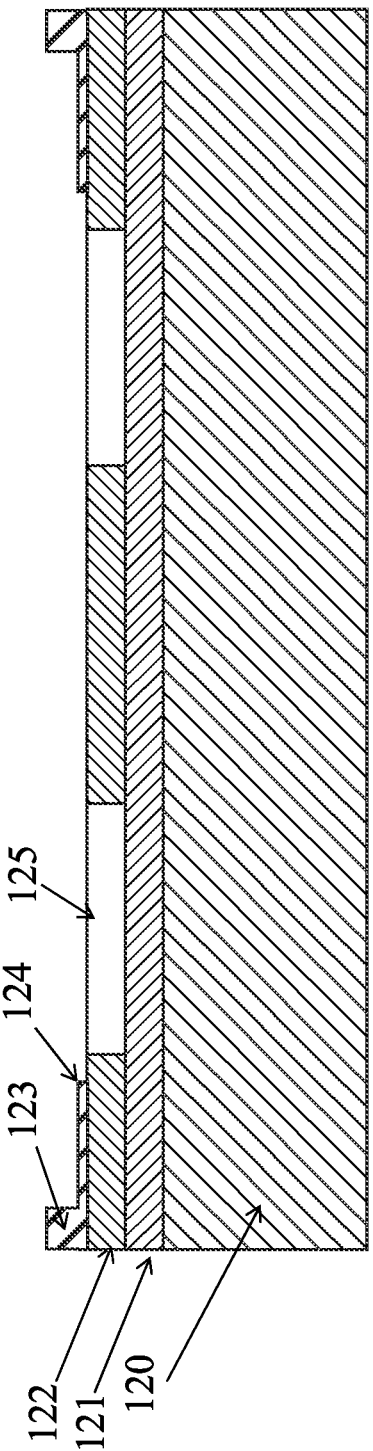

Depending on whether a barrier layer 124 is required for the metal thermocompression bonding, another photolithography may be performed on the silicon dioxide layer or silicon oxy-nitride layer 123. This photolithography is optional. If this barrier layer 124 is needed, then after completing the optional photolithography, another RIE is performed on the exposed silicon dioxide layer or silicon oxy-nitride layer 123 leaving a thin layer of silicon dioxide layer or silicon oxy-nitride layer 124 on the top surface of the SOI wafer 119 in regions where the bonding intermediary layers will be deposited as shown in FIG. 8D. If this optional photolithography is performed, then once the silicon dioxide layer or silicon oxy-nitride layer 124 has been etched the photoresist is stripped.

Next, another photolithography is performed on the top surface of the SOI wafer 119 and subsequently the device layer 122 of the SOI wafer 119 is etched using DRIE as shown 8E. Then the photoresist is removed.

Figure 8F:
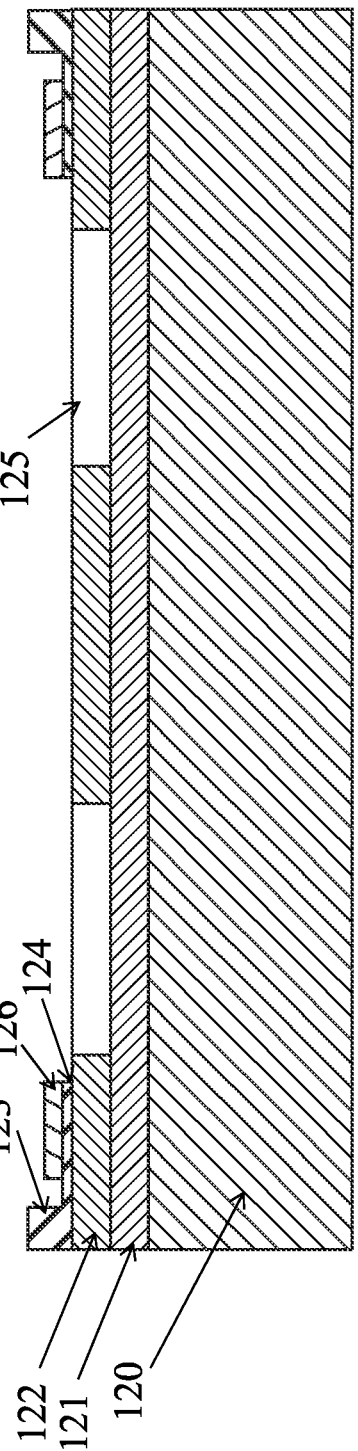

Subsequently, a lift-off process is performed whereby a photolithography is performed and then a gold layer for thermocompression bonding is deposited 126. The gold layer 126 is patterned by lifting off the photoresist thereby leaving the patterned gold 126 behind as shown in FIG. 8*f*. Alternatively to depositing a gold layer, an alloy layer 126 of gold and tin can be deposited, or an alloy layer 126 of gold and indium. Pure indium layer 126 could also be used as well as any suitable intermediary layer 126 used for wafer thermo-compression bonding.

If the optional photolithography on the silicon dioxide layer was not performed, then it may be advisable to deposit a barrier layer 126 prior to the gold, gold-alloy, or indium deposition. This barrier layer 126 can be deposited directly into the photolithography pattern defined by the liftoff process described above. The barrier layer 126 can be composed of chromium, chromium and niobium, or chromium and platinum or any other suitable barrier layer 126 that will prevent the gold layer 126 or gold alloy layer 126 from diffusing into the silicon device layer 122.

The middle 119 and bottom wafers 111 are then aligned and bonded to one another as shown in FIG. 8G. This is a thermo-compression bond, although any suitable wafer or die bonding process could be used.

The handle wafer 120 of the middle SOI wafer 119 is removed using DRIE or any suitable means. Then a photolithography is performed on the top of the exposed SOI dioxide layer 121 of the bonded wafer pair. The SOI silicon dioxide layer 121 is then etched using RIE and the photoresist removed thereby resulting in FIG. 8H.

A top wafer 130 composed of a single crystal silicon wafer 130 has photolithography performed on the top surface and subsequently a DRIE etch is performed to create the upper flow chambers 131 of the microvalve and the top sealing rings 132. After the DRIE has been performed to the depth of the top flow chamber 131, the photoresist is removed resulting in the structure shown in FIG. 8I.

The top wafer 130 then has a silicon nitride layer 133 deposited. Photolithography is then performed and the SiN layer 133 is etched using RIE. This etch on the SiN layer 133 is used to define the mechanically biasing of the microvalve 50 membrane plunger plate 155. A second and optional photolithography may be perform on the SiN layer 134 to make a diffusion barrier 134 on the surface of the top substrate 130 where the gold will be deposited for a subsequent wafer bonding step.

Subsequently, a photolithography is performed to conduct a liftoff process on a gold layer 135 for wafer bonding. After the photolithography has been performed, a layer 135 of gold, or gold-tin alloy, or gold-indium alloy, or indium layer is deposited onto the photoresist. Then the photoresist is removed leaving the deposited bonding layer 135 behind in regions were the photoresist was not present as shown in FIG. 8K.

If the optional photolithography on the silicon nitride layer was not performed, then it may again be advisable to deposit a barrier layer 134 prior to the gold, gold-alloy, or indium deposition. This barrier layer 134 can be deposited directly into the photolithography pattern defined by the liftoff process for the patterning of the bonding layer 135 described above. The barrier layer 134 can be composed of chromium, chromium and niobium, or chromium and platinum or any other suitable barrier layer 134 that will prevent the gold layer 135 from diffusing into the silicon substrate 130.

Next, the top substrate has photolithography performed on the backside of the wafer 130 and subsequently a DRIE is performed completely through the top wafer 130 to form the through wafer etched regions defined by 136 and 137 as shown in FIG. 8L.

The top 130 wafer is then aligned an bonded to the previously bonded and processed wafer pair shown in FIG. 8h composed of the bottom wafer 111 and the device layer 122 and silicon dioxide layer 121 of the SOI wafer 119 using thermocompression bonding methods as shown in FIG. 8M.

The open region 136 on the top wafer 111 in the microvalve 50 exposes the membrane plunger plate 55 where a piezoelectric actuator 54 attached by a suitable means (not shown). Electrical connections (not shown) are made to the piezoelectric actuator 54 thereby completing the fabrication process. The microvalve 50 will then be placed into a fixture 70 as shown, for example, in FIGS. 6A and 6B or package 80 as shown, for example, in FIGS. 7A and 7B for making fluidic connections.

It is understood that the 3-way pressure balanced microvalve 50 shown in FIGS. 5A and 5B, and described in the embodiment described herein represents only one of several variations wherein the dimensions or specific details are different and are covered by this disclosure and claimed in this patent.

It is further understood that the fabrication process described in FIGS. 8A-8M may be modified in the ordering or type of process steps performed and are covered by this disclosure and claimed in this patent.

What is claimed is:

1. A method for fabrication of a three-way pressure-balanced microvalve device comprising:
    bonding at least three pre-processed substrates having pre-determined sized flow channels to provide upper and lower fluid chambers made into one or more surfaces of the substrates, the bonded substrates including a plurality of fluidic ports and a movable membrane of a pre-determined thickness positioned near a center of the upper and lower fluid chambers; and
    positioning a piezoelectric actuator in one of the plurality of fluidic ports, extending inside the microvalve, to be provided in direct contact with the fluid in one of the fluidic ports of the microvalve during use and having one end permanently attached to the moveable membrane, wherein the piezoelectric actuator is configured to generate a normally-directed applied force upon the movable membrane to open and close one or more fluidic ports in the flow of fluids through the microvalve.

2. The method for fabrication of the three-way microvalve of claim 1, wherein the flow channels, and inlet and outlet ports, are made using deep, reactive ion etching (DRIE) methods.

3. The method for fabrication of the three-way microvalve of claim 1, wherein there are two inlet ports and one outlet port that access internal flow pathways in the microvalve.

4. The method for fabrication of the three-way microvalve of claim 1, wherein the microvalve composed of three substrates that are aligned and then bonded together to form the microvalve device.

5. The method for fabrication of the three-way microvalve of claim 1, wherein the substrates are bonded using aligned thermocompression bonding.

6. The method for fabrication of the three-way microvalve of claim 5, wherein the substrates are aligned and bonded using thermocompression bonding and an intermediary layer of polymer.

7. The method for fabrication of the three-way microvalve of claim 1, wherein the substrates are aligned and bonded using thermocompression bonding and an intermediary layer of either gold, gold and tin, gold and indium, or indium.

8. The method for fabrication of the three-way microvalve of claim 1, wherein the substrates are aligned and bonded using thermocompression bonding and an intermediary of solder paste.

9. The method for fabrication of the three-way microvalve of claim 1, wherein a thin, mechanically compliant membrane located approximately in the middle of the flow channels can be deflected by an attached piezoelectric actuator to open and close inlet and outlet ports of the microvalve.

10. The method for fabrication of the three-way microvalve of claim 9, wherein the membrane layer thickness and thereby mechanical compliance can be accurately controlled using a single-on-insulator (SOI) wafer.

11. The method of fabrication of the three-way microvalve of claim 1, wherein the microvalve is actuated using a piezoelectric actuator.

12. The method of fabrication of the three-way microvalve of claim 1, wherein the piezoelectric actuator is a piezoelectric actuator stack to obtain larger displacements and stroke of the microvalve thereby reducing flow resistances.

13. The method of fabrication of the three-way microvalve of claim 1, wherein sealing rings are fabricated around fluid inlet and outlet ports to reduce flow resistance and stiction effects.

14. The method for fabrication of the three-way microvalve of claim 13, wherein the sealing rings are made using deep, reactive ion etching (DRIE) of silicon.

15. The method for fabrication of the three-way microvalve of claim 1, wherein one or more material layers are made to strain-bias the membrane resulting in a normally-closed microvalve configuration.

16. The method for fabrication of the three-way microvalve of claim 1, wherein the one or more of the substrates are made of silicon.

17. The method for fabrication of the three-way microvalve of claim 1, wherein the top and bottom substrates are made from glass, metal, semiconductor, or a ceramic, of some combination thereof.

18. The method for fabrication of the three-way microvalve of claim 1, wherein the movable membrane separates the fluid chamber into the upper fluid chamber and the lower fluid chamber and includes a plurality of openings fluidically connecting the upper fluid chamber and the lower fluid chamber.

19. The method for fabrication of the three-way microvalve of claim 1, wherein the membrane areas in contact with the fluid are approximately equal on both sides of the membrane resulting in a balanced pressure of the fluid within the fluid chambers of the microvalve.

* * * * *